(12) United States Patent
Tsukamoto

(10) Patent No.: US 10,623,587 B2
(45) Date of Patent: Apr. 14, 2020

(54) IMAGE FORMING APPARATUS

(71) Applicant: KONICA MINOLTA, INC., Chiyoda-ku, Tokyo (JP)

(72) Inventor: Yasumasa Tsukamoto, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/243,167

(22) Filed: Jan. 9, 2019

(65) Prior Publication Data
US 2019/0238685 A1 Aug. 1, 2019

(30) Foreign Application Priority Data

Jan. 31, 2018 (JP) .................................. 2018-014361

(51) Int. Cl.
*H04N 1/00* (2006.01)

(52) U.S. Cl.
CPC ..... *H04N 1/00029* (2013.01); *H04N 1/00005* (2013.01); *H04N 1/00015* (2013.01); *H04N 1/00074* (2013.01); *H04N 1/00084* (2013.01)

(58) Field of Classification Search
CPC ......... H04N 1/047; H04N 2201/04715; H04N 2201/04743; H04N 1/04; H04N 1/00005; H04N 1/00015; H04N 1/00029; H04N 1/00074; H04N 1/00084; G06F 3/121; G06F 3/1273; G06F 3/1294; G06K 15/02
USPC ................................ 358/1.15, 474, 488, 448
See application file for complete search history.

(56) References Cited

U.S. PATENT DOCUMENTS

| 4,977,458 | A | * | 12/1990 | Granger | ............... | H04N 1/4058 |
| | | | | | | 358/3.26 |
| 5,939,281 | A | * | 8/1999 | Lehmann | ........... | G01N 33/6872 |
| | | | | | | 435/7.94 |
| 5,967,050 | A | * | 10/1999 | Seymour | ............ | H04N 1/00005 |
| | | | | | | 101/484 |
| 6,075,614 | A | * | 6/2000 | Ohtsuka | ............... | H04N 1/4078 |
| | | | | | | 347/19 |
| 6,078,400 | A | * | 6/2000 | Mizutani | ................ | G06F 3/121 |
| | | | | | | 358/1.14 |
| 2003/0090742 | A1 | * | 5/2003 | Fukuda | .................... | H04N 1/04 |
| | | | | | | 358/448 |

(Continued)

FOREIGN PATENT DOCUMENTS

JP 2016146514 A 8/2016

*Primary Examiner* — Negussie Worku
(74) *Attorney, Agent, or Firm* — Buchanan Ingersoll & Rooney PC

(57) ABSTRACT

An image forming apparatus includes: an image former that forms an image on a recording medium; and a hardware processor that acquires a read image obtained by reading the recording medium and determines a pass/fail for the image, wherein at the time of proof output, the hardware processor is capable of performing image inspection in which at least a read image obtained by reading a recording medium printed during the proof output is compared with a printing image of a job and a pass/fail is determined, and at the time of actual output of the job, the hardware processor is capable of performing image inspection in which at least a read image obtained by reading a recording medium printed during the actual output is compared with the read image obtained by reading the recording medium printed during the proof output and a pass/fail for an image is determined.

15 Claims, 16 Drawing Sheets

(56) References Cited

U.S. PATENT DOCUMENTS

| | | | |
|---|---|---|---|
| 2004/0012806 A1* | 1/2004 | Murata | G06F 11/0748 358/1.14 |
| 2004/0179717 A1* | 9/2004 | Furukawa | G06T 7/001 382/112 |
| 2006/0044583 A1* | 3/2006 | Ishijima | H04N 1/6052 358/1.13 |
| 2008/0144080 A1* | 6/2008 | Randt | G06F 3/121 358/1.15 |
| 2009/0231614 A1* | 9/2009 | Oku | H04N 1/047 358/1.15 |
| 2010/0033752 A1* | 2/2010 | Oi | G06K 15/02 358/1.14 |
| 2010/0188696 A1* | 7/2010 | Ohmiya | G06F 3/1207 358/1.15 |
| 2010/0328698 A1* | 12/2010 | Toriyabe | G06F 3/121 358/1.14 |
| 2012/0032677 A1* | 2/2012 | Dannels | G01R 33/5659 324/309 |
| 2012/0084606 A1* | 4/2012 | Igarashi | G03G 15/5079 714/37 |
| 2013/0021641 A1* | 1/2013 | Park | G06F 3/121 358/1.14 |
| 2015/0170011 A1* | 6/2015 | Hattori | G06K 15/408 358/1.6 |
| 2016/0231964 A1* | 8/2016 | Oki | H04N 1/047 |
| 2019/0109954 A1* | 4/2019 | Tsue | H04N 1/00328 |
| 2019/0158683 A1* | 5/2019 | Aizawa | H04N 1/00087 |
| 2019/0178813 A1* | 6/2019 | Kanai | G01N 21/9501 |
| 2019/0188841 A1* | 6/2019 | Kato | G06T 7/001 |
| 2019/0281169 A1* | 9/2019 | Kawasaki | H04N 1/00037 |
| 2019/0342458 A1* | 11/2019 | Shimura | H04N 1/00814 |

\* cited by examiner

IMAGE FORMING APPARATUS

The entire disclosure of Japanese patent Application No. 2018-014361, filed on Jan. 31, 2018, is incorporated herein by reference in its entirety.

BACKGROUND

Technological Field

The present invention relates to an image forming apparatus capable of determining a pass/fail for an image on the basis of a read image obtained by reading a printed matter.

Description of the Related Art

In the field of image forming apparatuses such as copying machines, printers, and multifunction peripherals, apparatuses that analyze a read image obtained by reading an image on a sheet to find an image abnormality and adjust the image quality are known. For example, by determining whether the read image coincides with a correct image such as an image for printing through comparison between the read image and the correct image, it is determined whether image stain, color shift, positional deviation, or the like has occurred, or streak information and the like are found by a failure diagnosis function to diagnose a failed part of the machine. There is also known an apparatus that prints an adjustment image on an insertion sheet, a cutting margin, or the like of the sheet to read and analyzes the adjustment image to adjust the image quality. Also in a case where the image quality is adjusted by reading the adjustment image, an abnormality can be determined according to impossibility of adjustment or the like. When the image is determined to be abnormal, the concerned sheet is regarded to be defective and a process such as discharging a waste sheet to a discharge destination different from that of a regular sheet is performed.

For example, JP 2016-146514 A discloses an apparatus that inspects the quality of a printed matter by reading a sheet for which printing has been completed and comparing a correct image with a scanned image obtained by scanning the printed sheet. In JP 2016-146514 A, a sheet printed in advance is scanned and a scanned image visually checked and ascertained by a user that there is no abnormality therein is used as a correct image.

However, in JP 2016-146514 A, since visual confirmation by the user is necessary when the correct image is created, the work is troublesome and, if the user misses an abnormality, a problem arises that an image having an abnormality is mixed in the correct image.

SUMMARY

The present invention has been made in view of the above circumstances and an object thereof is to provide an image forming apparatus capable of efficiently and accurately determining a pass/fail for an image at the time of pass/fail determination for an image on a recording medium.

To achieve the abovementioned object, according to an aspect of the present invention, there is provided an image forming apparatus that prints an image on a recording medium on the basis of a job, and the image forming apparatus reflecting one aspect of the present invention comprises: an image former that forms an image on a recording medium; and a hardware processor that acquires a read image obtained by reading the recording medium on which the image is formed by the image former and determines a pass/fail for the image on the recording medium on the basis of the read image, wherein at the time of proof output, the hardware processor is capable of performing image inspection in which at least a read image obtained by reading a recording medium printed during the proof output is compared with a printing image of a job before an image is formed and a pass/fail for an image on the recording medium is determined, and at the time of actual output of the job, the hardware processor is capable of performing image inspection in which at least a read image obtained by reading a recording medium printed during the actual output is compared with the read image obtained by reading the recording medium printed during the proof output and a pass/fail for an image on the recording medium by the actual output is determined.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
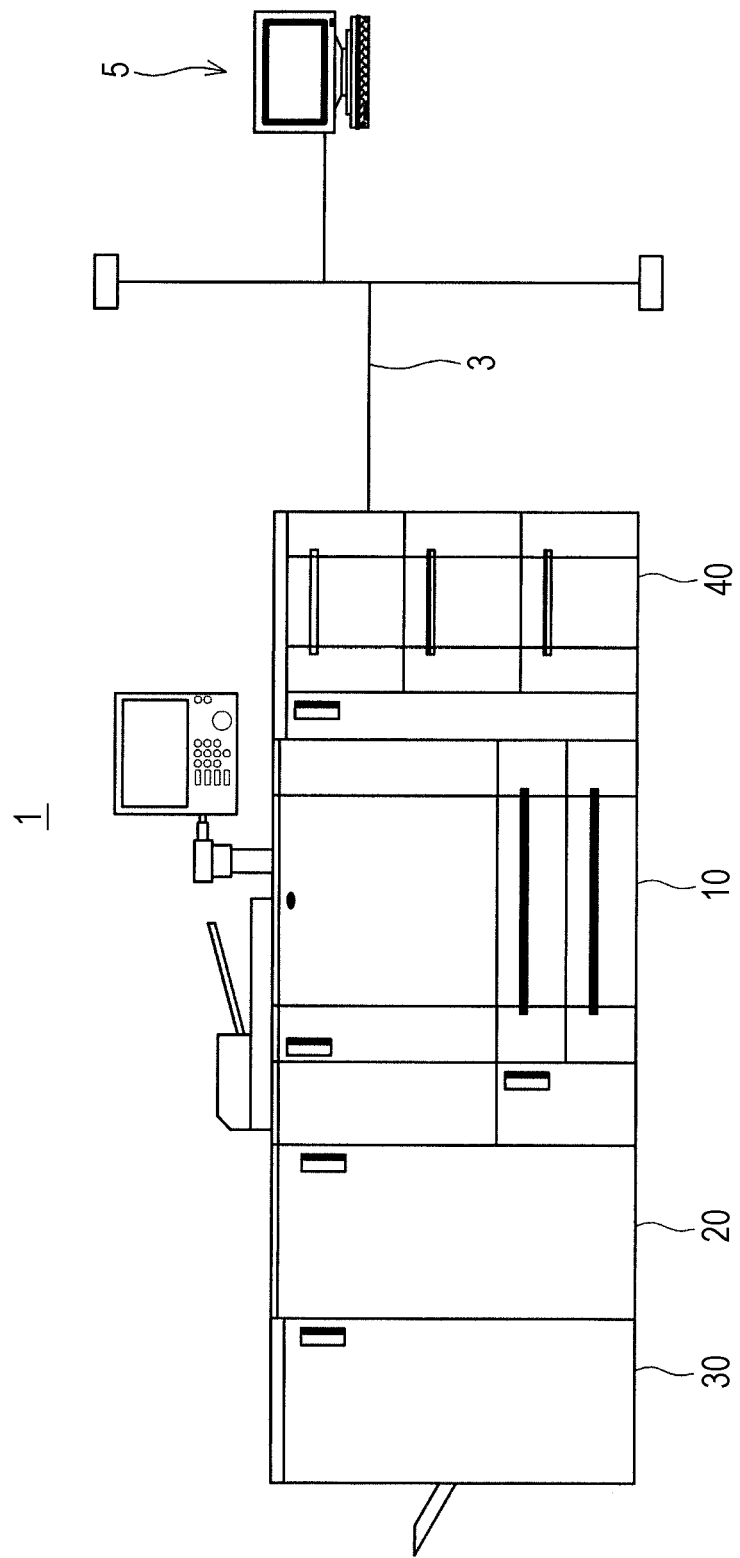
FIG. 1 is a diagram illustrating the configuration of an image forming apparatus according to an embodiment of the present invention.
Figure 2:
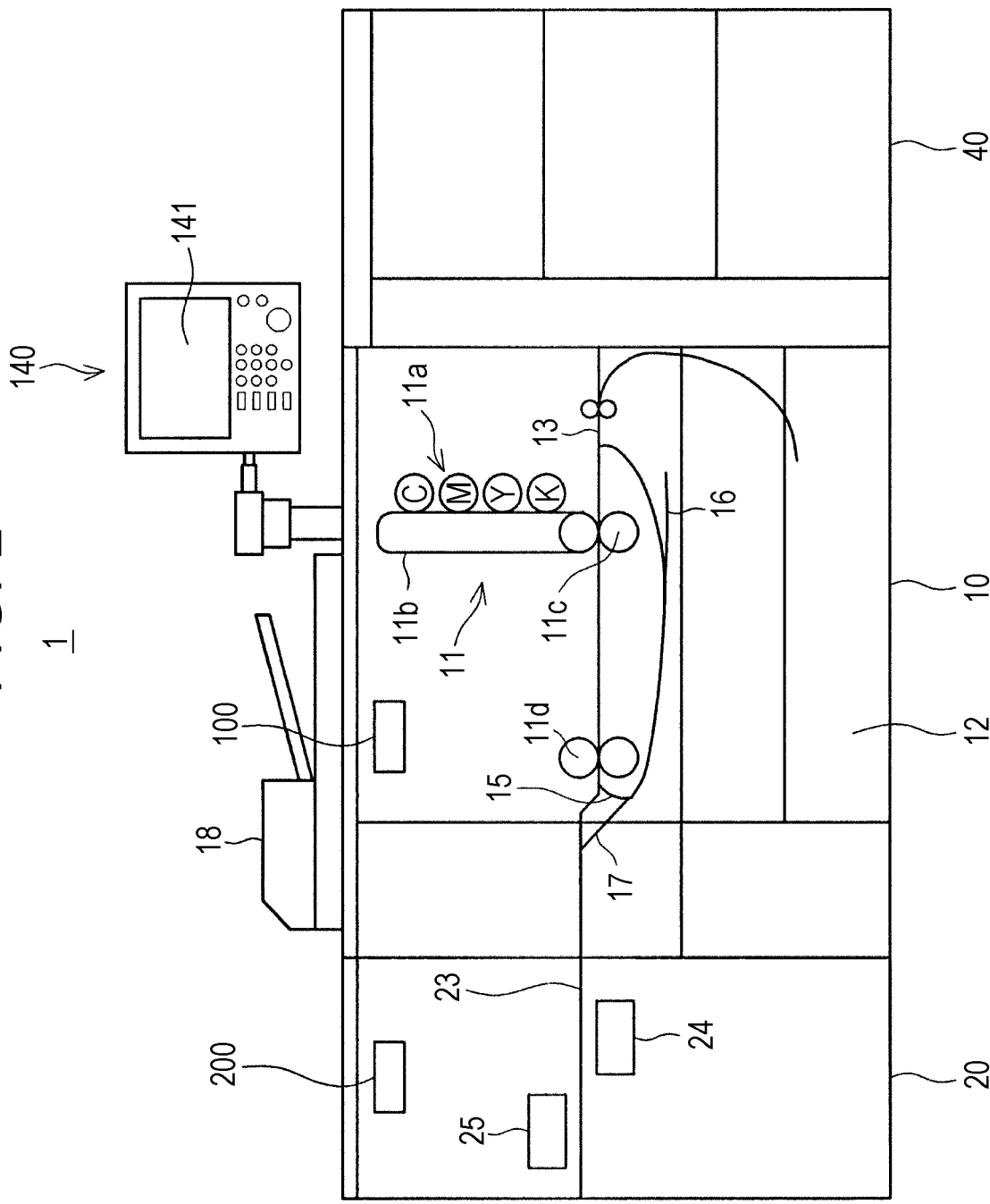
FIG. 2 is, similarly to above, a diagram schematically illustrating a mechanical configuration of the image forming apparatus.

As illustrated in FIGS. 1 and 2, the image forming apparatus 1 is provided with an apparatus main body 10 that forms an image, and has a sheet feeding device 40 on the preceding stage side of the apparatus main body 10, a reading device 20 on the subsequent stage side of the apparatus main body 10, and a sheet discharge device 30 on the subsequent stage side of the reading device 20. Each device and the apparatus main body are electrically and mechanically connected and communication and sheet conveyance are possible between connections.

An external device 5 and the like are connected to the image forming apparatus 1 via a local area network (LAN) 3. Note that another network can be used for the LAN 3; the LAN 3 is not limited to a particular one and a wide area network (WAN) or the like may be used regardless of whether it is wired or wireless.

The sheet feeding device 40 is provided with a plurality of sheet feed stages that accommodates sheets. The sheets accommodated in the sheet feed stages can be supplied to the apparatus main body 10 at the subsequent stage. The sheet corresponds to a recording medium according to the present invention. In the present invention, the material of the recording medium is not limited to paper and may be made of cloth, plastic, or the like.

In the apparatus main body 10, a main body sheet feeder 12 provided with a plurality of sheet feed trays is arranged on a lower side in a casing. In the main body sheet feeder 12, sheets are accommodated in each sheet feed tray. The sheet corresponds to the recording medium according to the present invention. The material of the recording medium is not limited to paper and may be made of cloth or plastic.

A conveyance path 13 is prepared within the casing of the apparatus main body 10 and the sheet supplied from the sheet feeding device 40 or the main body sheet feeder 12 is conveyed to a downstream side along the conveyance path 13.

An image former 11 that forms an image on the sheet is prepared near the middle of the conveyance path 13.

The image former 11 has photoconductors 11*a* for each color (cyan, magenta, yellow, and black) and a charger, a laser diode (LD), a developer, a cleaner, and the like (not illustrated) are provided around the photoconductors 11*a*. The image former 11 also has an intermediate transfer belt 11*b* at a position where the intermediate transfer belt 11*b* makes contact with the photoconductors 11*a* for each color. The intermediate transfer belt 11*b* makes contact with the sheet on the conveyance path 13 at a secondary transferer 11*c* prepared in the middle of the intermediate transfer belt 11*b*. In addition, a fixer 11*d* is provided at a position on the downstream side of the secondary transferer 11*c* on the conveyance path 13.

In the case of forming an image on the sheet, after the photoconductors 11*a* are uniformly charged by the charger, the photoconductors 11*a* are irradiated with a laser beam from the LD and latent images are formed on the photoconductors 11*a*. The latent images on the photoconductors 11*a* are developed by the developer to toner images, the toner images on the photoconductor 11*a* are transferred to the intermediate transfer belt 11*b*, and the image on the intermediate transfer belt 11*b* is transferred onto the sheet at the secondary transferer 11*c*. The image is fixed by the fixer 11*d* on the sheet conveyed along the conveyance path 13 after the image is formed thereon.

In this embodiment, the image former 11 has been described as forming a multicolor image. However, in the present invention, the image former 11 may form an image in a single color such as monochrome.

In addition, a reverse conveyance path 15 branches off from the conveyance path 13 on the downstream side of the fixer 11*d*. A downstream conveyance path 17 branches off from the middle of the reverse conveyance path 15 and is connected to the conveyance path 13 on the downstream side of the branching location of the reverse conveyance path 15. A withdrawal conveyance path 16 branches off from the reverse conveyance path 15 on the downstream side of a location where the downstream conveyance path 17 branches off. A downstream end of the reverse conveyance path 15 joins the conveyance path 13 at a position on the upstream side of the image former 11. The conveyance path 13 is connected to a conveyance path 23 of the reading device 20 connected at the subsequent stage in a straight direction.

In the case of forming an image on one side of the sheet, the sheet after the image formation is continuously conveyed straight on the conveyance path 13 and conveyed to the conveyance path 23 of the reading device 20.

In the case of switching a face side of the sheet after the image formation, the sheet is conveyed to the reverse conveyance path 15 and further conveyed beyond the branch point of the downstream conveyance path 17; then, the sheet is conveyed in an opposite direction on the reverse conveyance path 15 so as to be conveyed to the downstream side of the conveyance path 13 through the downstream conveyance path 17.

In the case of forming an image on the back side of the sheet by reversing the sheet, the sheet is sent from the conveyance path 13 to the reverse conveyance path 15 to be sent to the withdrawal conveyance path 16; then, the leading and trailing sides of the sheet are interchanged and the sheet is sent to the downstream side of the reverse conveyance path 15 so as to be circulated to the conveyance path 13. Thereafter, the image former 11 forms an image on the back side of the sheet.

Furthermore, the apparatus main body 10 is provided with an operation part 140 on a top portion of the casing. The operation part 140 has a liquid crystal display (LCD) 141 provided with a touch panel and a group of operation keys, such as a numeric keypad, so as to be able to display information and accept operation input. The operation part 140 corresponds to a display and also serves as an operation part.

In this embodiment, the operation part 140 is constituted by integrating the operation part and the display, but the operation part and the display may not be integrated. For example, the operation part may be constituted by a mouse, a tablet, a terminal, or the like. In addition, the LCD 141 may be movable.

An automatic document feeder (ADF) 18 is provided on a top portion of the casing of the apparatus main body 10 at a place where the operation part 140 is not located. The automatic document feeder (ADF) 18 automatically feeds a document set on a document table and a document fed by the automatic document feeder (ADF) 18 is read by a scanner 130 illustrated in FIG. 4.

A document on a platen glass (not illustrated) can also be read.

In the scanner 130, it is also possible to set a printed matter output from the image forming apparatus 1 to perform reading. For example, it is possible to set a sheet output by the image forming apparatus 1 to perform reading such that an image formed on the sheet is read. In this case, the scanner 130 corresponds to an image reader.

Furthermore, the apparatus main body 10 has an image control part 100. The image control part 100 controls the entire image forming apparatus 1 and can be constituted by a central processing unit (CPU), a program activated by the CPU, a memory, and the like. Note that the image control part 100 may be prepared outside the apparatus main body.

The reading device 20 has the conveyance path 23 and the sheet introduced from the apparatus main body 10 is conveyed along the conveyance path 23. The downstream side of the conveyance path 23 is connected to the sheet discharge device 30 at the subsequent stage.

An image reader 24 that reads an image on a lower surface of the sheet conveyed through the conveyance path 23 and an image reader 25 that reads an image on an upper surface of that sheet are provided near the middle of the conveyance path 23, where the image reader 24 is positioned on the upstream side of the image reader 25 in a sheet conveyance direction.

The image readers 24 and 25 can be constituted by a charge coupled device (CCD) sensor, a complementary metal oxide semiconductor (CMOS) sensor, or the like, and are capable of reading an image of the sheet conveyed through the conveyance path 23 over the entire direction intersecting with the conveyance direction. Reading results obtained by reading by the image readers 24 and 25 are transmitted to a reading control part 200 provided in the reading device 20. The reading control part 200 can be constituted by a CPU, a program activated by the CPU, a memory, and the like. Note that the reading control part 200 may be prepared outside the apparatus main body.

In the above description, the two image readers read the images of the front and back surfaces of the sheet, but the images of the front and back surfaces of the sheet may be read by one image reader by preparing a reverse conveyance path ahead of and behind the image reader and reversely conveying the sheet.

In this embodiment, the reading device is described as being mechanically connected inline to the apparatus main body, but the reading device may not be mechanically connected to the image forming apparatus. The reading result may be sent to the image control part through connection by way of a communication line or a network.

When the image control part 100 performs image inspection, the reading control part 200 transfers the read image to the image control part. In this case, the image control part corresponds to a control part according to the present invention. Furthermore, the reading control part 200 may perform image inspection using the read image. In this case, the reading control part corresponds to the control part according to the present invention.

The control part at least can ascertain the pass/fail for an image by comparing the read image obtained by reading in the image reader and the correct image, and the result can be utilized as a result of pass/fail determination; additionally, it is possible to settle the pass/fail determination upon acceptance of settlement by a user.

In comparing images, different correct images are used for proof output and actual output. The proof output is for printing one copy of an output item or the like in order to confirm the outcome or the like.

In the proof output, image inspection is performed by utilizing a printing image of a job, such as a raster image processor (RIP) image, as the correct image.

In the actual output, a read image obtained by reading an image printed during the proof output is used as the correct image. In this case, it is desirable to use, as the correct images, only those for which the read images at the proof output are determined to be normal by image pass/fail determination.

At the time of comparing images, it is possible to ascertain the pass/fail for images in accordance with predetermined criteria; the criteria are not particularly limited and different criteria may be used depending on jobs.

Figure 3:
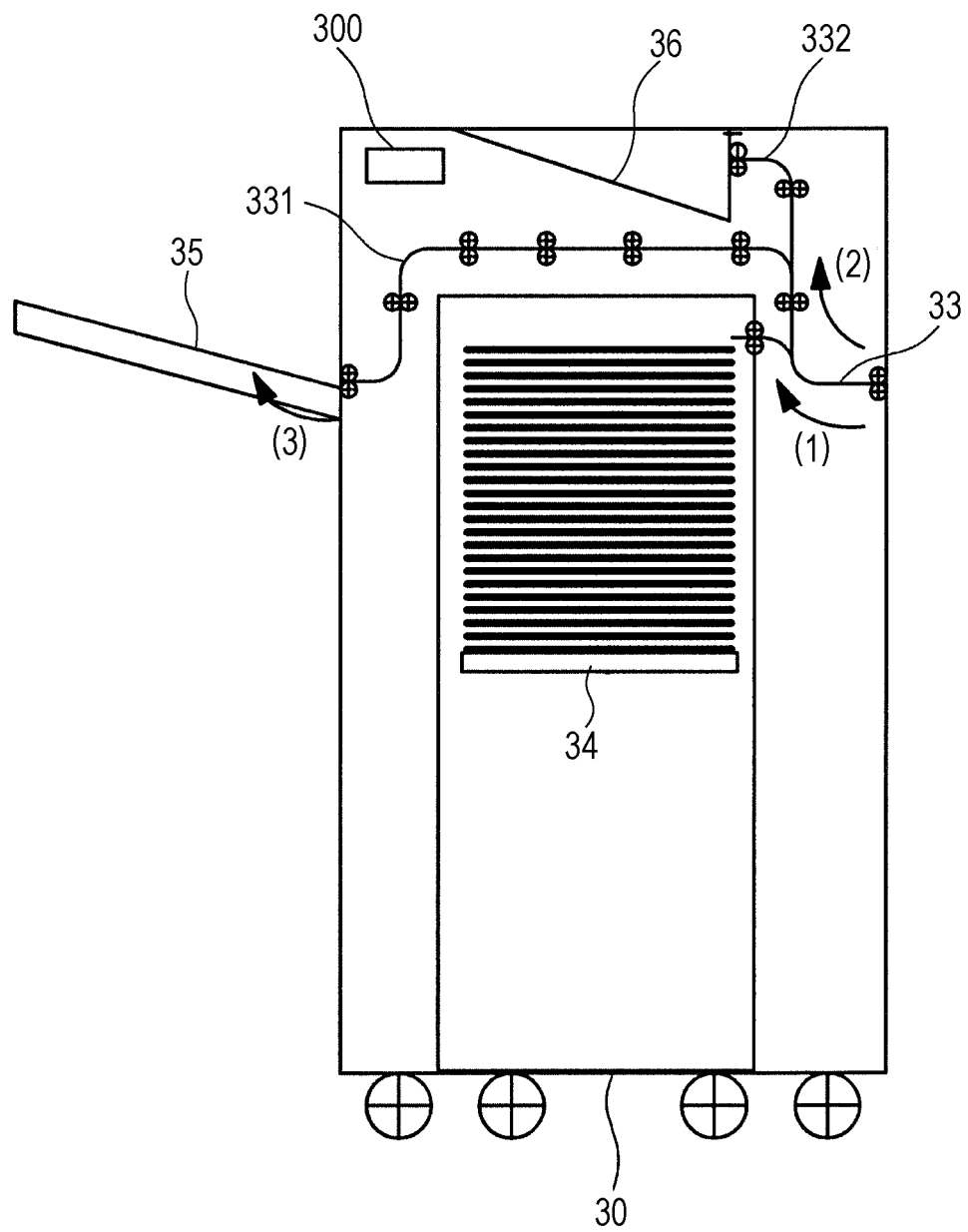
FIG. 3 is, similarly to above, a diagram schematically illustrating a mechanical configuration of a sheet discharge device.

The sheet having passed through the reading device 20 is conveyed to the sheet discharge device 30 and discharged to a predetermined sheet discharge destination. FIG. 3 illustrates an example of the sheet discharge device 30.

As illustrated in FIG. 3, the sheet discharge device 30 has a conveyance path 33 connected to the conveyance path 23 of the reading device 20, and is capable of conveying the sheet conveyed through the conveyance path 23 within the sheet discharge device 30 through the conveyance path 33. The conveyance path 33 branches off to a first conveyance path 331 and a second conveyance path 332 on the downstream side, where a second sheet discharge tray 35 is connected to the first conveyance path 331, and an abnormal sheet discharge tray 36 is connected to the second conveyance path 332. Furthermore, the sheet discharge device 30 has therein a first sheet discharge tray 34 for stacking sheets and discharging sheets, and the sheet is conveyed thereto through the conveyance path 33.

Although this sheet discharge device 30 is provided with three sheet discharge destinations, the number of sheet discharge destinations is not particularly limited and one sheet discharge destination may be employed. In the sheet discharge device 30, the sheet discharge destination can be switched. In the sheet discharge device 30, in a case where an abnormality is detected in the sheet by image inspection or the like, the sheet can be distinguished from a normal discharged sheet when discharged. To distinguish the discharged sheets, the sheets may be discharged to different sheet discharge destinations; alternatively, the discharged sheets may be distinguished by changing the discharge position, orientation, and the like even at the same sheet discharge destination.

The sheet discharge device 30 is provided with a sheet discharge control part 300 which controls sheet conveyance, sheet discharge destination switching, and the like in response to a command from the image control part 100 or the like.

In this embodiment, the image forming apparatus 1 is constituted by the sheet feeding device 40, the apparatus main body 10, the reading device 20, and the sheet discharge device 30; however, the number and types of apparatuses constituting the image forming apparatus of the present invention are not limited to those described above, and the image forming apparatus 1 may be constituted only by the apparatus main body 10. In this case, the image reader is present outside the image forming apparatus. In addition to the sheet feeding device 40, the apparatus main body 10, the reading device 20, and the sheet discharge device 30, other devices may be provided. For example, a plurality of sheet discharge devices may be connected to increase the number of sheet dischargers, or a post-processing device may be prepared at the subsequent stage of the reading device to enable a post-process for the sheet.

In this embodiment, the image readers 24 and 25 are installed in the reading device 20, but an image reader may be prepared, for example, in the apparatus main body 10. Furthermore, the reading device may not be mechanically connected to the image forming apparatus. As long as the reading result can be acquired even if the reading device is mechanically offline, the function as the present invention can be fulfilled.

Additionally, by providing a post-processing device in the image forming apparatus, a predetermined post-process can be performed on the sheet after printing. The contents of the post-process are not particularly limited and appropriate processes such as punching, stapling, and a booklet process can be performed; a plurality of post-processes may be performed.

Figure 4:
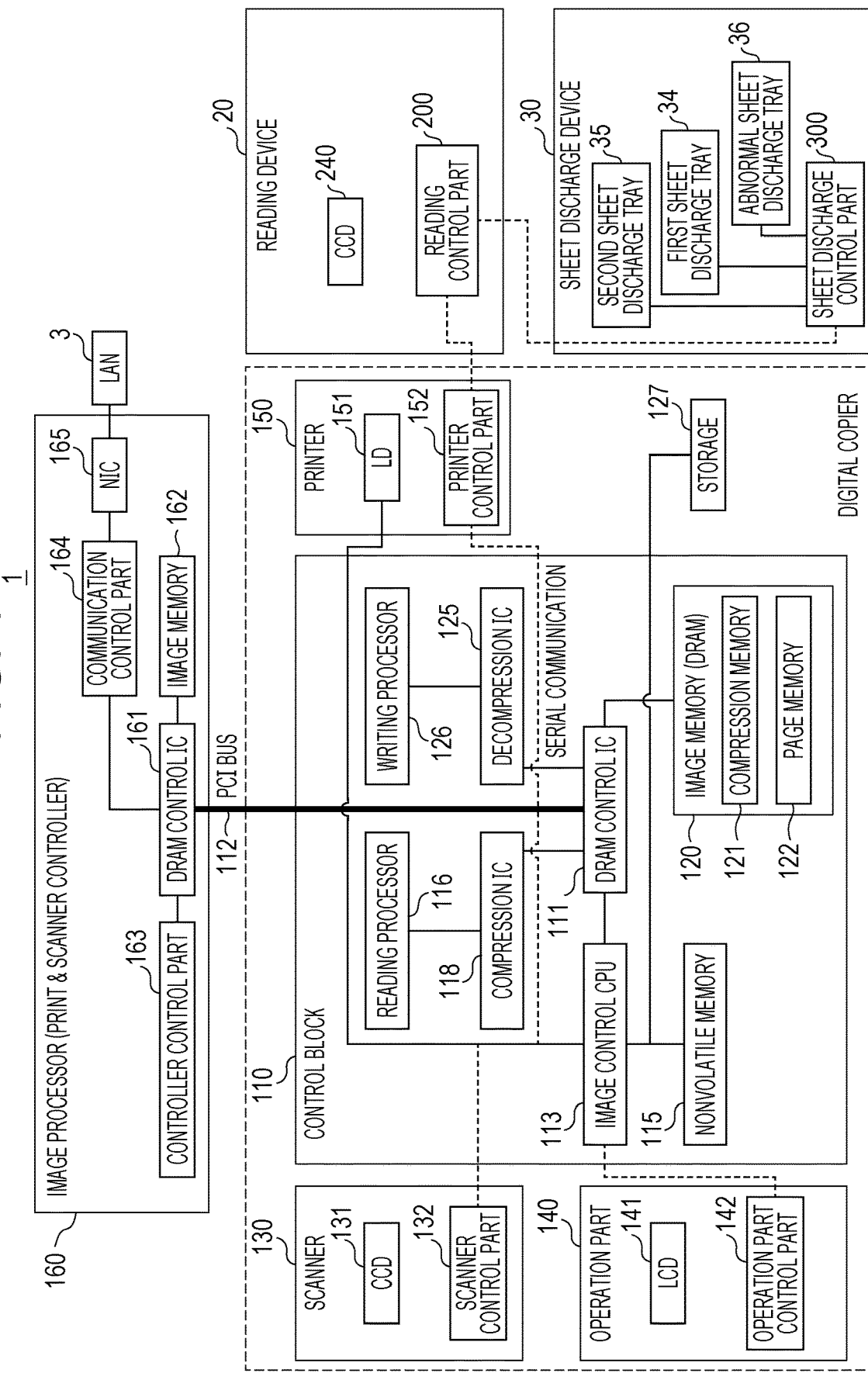
FIG. 4 is, similarly to above, a diagram illustrating control blocks of the image forming apparatus.

Next, functional blocks of the image forming apparatus 1 will be described with reference to FIG. 4.

The image forming apparatus 1 has a digital copier provided with a control block 110, the scanner 130, the operation part 140, and a printer 150, an image processor (print & scanner controller) 160, the reading device 20, and the sheet discharge device 30. The image processor (print & scanner controller) 160 performs a process on image data acquired from an external device or the like.

The control block 110 has a peripheral component interconnect (PCI) bus 112 and a dynamic random access memory (DRAM) control integrated circuit (IC) 111 is connected to the PCI bus 112, while an image control CPU 113 is connected to the DRAM control IC 111.

A nonvolatile memory 115 is connected to the image control CPU 113. Programs executed by the image control CPU 113, setting data such as machine setting information, process control parameters, criteria for determining the pass/fail for the image on the basis of comparison between the read image and the correct image, and the like are retained in the nonvolatile memory 115.

The image control CPU 113 is capable of grasping the entire state of the image forming apparatus 1 by executing the program and controlling the image forming apparatus 1 and can perform control of actions such as sheet conveyance and image formation, processes on image data for image formation, image inspection, and the like. In this embodiment, the control part of the present invention is constituted by the image control CPU 113 and a program activated by the image control CPU 113. The above program includes a program according to the present invention. The program may be retained in a hard disk drive (HDD) or the like as well as the nonvolatile memory or may be retained in a portable storage medium.

A storage 127 is additionally connected to the image control CPU 113. The storage 127 can be constituted by a random access memory (RAM), an HDD, a solid state drive (SSD), or the like, and desired information such as image data, job data, programs and parameters, and data of the correct image can be retained in the storage 127. The storage 127 may be provided with a plurality of devices.

A scanner control part 132 of the scanner 130 is additionally connected to the image control CPU 113 so as to enable serial communication.

The scanner 130 is provided with a CCD 131 that optically reads an image on a sheet and the scanner control part 132 that controls the entire scanner 130. The scanner control part 132 controls each part of the scanner 130 in response to an instruction from the image control CPU 113. The scanner control part 132 is constituted by a CPU, a storage, a program activated by the CPU, and the like. A reading processor 116 is connected to the CCD 131.

An operation part control part 142 of the operation part 140 is additionally connected to the image control CPU 113 so as to enable serial communication. The operation part 140 is provided with the touch panel type LCD 141 and the operation part control part 142.

In the touch panel type LCD 141, operation can be input and information can be displayed. The operation part control part 142 can control the entire operation part 140 on the basis of an instruction from the image control CPU 113 and also can transmit information to the image control CPU 113. The operation part control part 142 can be constituted by a CPU, a storage, a program that activates the CPU, and the like.

In the operation part 140, it is possible to set image forming conditions and to input action control conditions such as action commands for the image forming apparatus 1 and furthermore, it is possible to display setting contents, machine states, information, and the like. In the operation part 140, it is also possible, for example, to set whether the proof output is to be carried out and to perform operation for settling the image comparison result in image inspection.

Furthermore, in the image control CPU 113, it is possible to determine the pass/fail for the image on the sheet by comparing the read image acquired by reading the printed matter by the image readers 24 and 25 with the correct image prepared in advance. The pass/fail for the image can be determined by a known technique such as pattern matching. For example, when the difference of the comparison result is equal to or greater than a predetermined value, the image is determined to be defective. When the image is determined to be defective, control can be exercised such that the sheet on which the defective image is printed is distinguished from the regular sheet when discharged. The discharged sheet that has been distinguished may be discharged to a different sheet discharge destination, or the discharged sheet may be distinguished, for example, by changing the discharge position or the orientation of the sheet when discharged. In this embodiment, the abnormal sheet discharge tray 36 is selected as a sheet discharge destination different from the regular sheet discharge destination. As the regular sheet discharge destination, either the first sheet discharge tray 34 or the second sheet discharge tray 35 may be employed, and different sheet discharge destinations may be chosen depending on jobs.

A printer control part 152 of the printer 150 is additionally connected to the image control CPU 113 so as to enable serial communication.

The printer 150 is provided with an LD 151 and the printer control part 152. The printer control part 152 controls the entire printer 150 on the basis of an instruction from the image control CPU 113, and controls sheet conveyance and image forming action. The printer 150 includes the image former 11, the conveyance paths 13, 23, and 33, and the like.

The LD 151 collectively refers to LDs for each color. The LD 151 forms a latent image on the photoconductor on the basis of image data processed by a writing processor 126 and an image is formed.

In addition, an image memory (DRAM) 120 is connected to the DRAM control IC 111.

The image memory (DRAM) 120 retains image data acquired by the scanner 130 and image data acquired through the LAN 3, and is provided with a compression memory 121 for retaining compressed image data and a page memory 122 for retaining uncompressed image data.

The compression memory 121 can retain data obtained by compressing image data received from the outside, and the like, while the page memory 122 can retain image data extended for image formation, a reference image data used for determining the pass/fail for the read image, and the like.

The image memory (DRAM) 120 can retain image data and setting data of the job to be output. The data of jobs can also be retained in the storage 127.

Note that image data relating to a plurality of jobs can be stored in the image memory 120 by the DRAM control IC 111. That is, the image memory 120 can also retain image data of a reserved job.

A compression IC 118 is connected to the DRAM control IC 111, and the reading processor 116 is connected to the compression IC 118.

The reading processor 116 performs a predetermined process such as a shading process on image data acquired by the CCD 131 of the scanner 130.

The compression IC 118 is capable of compressing image data, and the image data after compression is retained in the compression memory 121.

A decompression IC 125 is connected to the DRAM control IC, and the writing processor 126 is connected to the decompression IC 125.

The decompression IC 125 decompresses the compressed image data, and the data after decompression is temporarily retained in the page memory 122 and then used for image formation or the like.

The writing processor 126 performs a predetermined process on the image data for image formation, and the processed image data is sent to the LD 151 of the printer 150 such that an image is formed.

In addition, the reading control part 200 of the reading device 20 is connected to the printer control part 152 of the printer 150.

The reading device 20 has a CCD 240 that reads an image and the reading control part 200 that controls a CCD scanner. The reading control part 200 is constituted by a CPU, a storage, a program, and the like. The reading control part 200 controls the entire reading device 20 in accordance with an instruction from the image control CPU 113, and is capable of, for example, reading an image and transferring the image data that has been read.

The sheet discharge control part 300 of the sheet discharge device 30 is electrically connected to the reading control part 200.

The sheet discharge control part 300 controls the entire sheet discharge device 30, and controls sheet discharge in accordance with an instruction from the image control CPU 113. The sheet discharge control part 300 is constituted by a CPU, a program activated by the CPU, a storage, and the like.

The first sheet discharge tray 34, the second sheet discharge tray 35, and the abnormal sheet discharge tray 36 are controllably connected to the sheet discharge control part 300 such that sheet conveyance and sheet discharge switching can be performed.

A DRAM control IC 161 of the image processor (print & scanner controller) 160 is also connected to the PCI bus 112.

When the image forming apparatus is used as a network printer or a network scanner, for example, the image processor (print & scanner controller) 160 causes the image forming apparatus 1 to receive image data and the like from the external device 5 or the like connected to the LAN 3, and to transmit the image data acquired by the scanner 130 to an external device or the like.

In the image processor (print & scanner controller) 160, an image memory 162 is connected to the DRAM control IC 161. The image memory 162 is constituted by a DRAM or the like. In the image processor (print & scanner controller) 160, a controller control part 163 and a communication control part 164 are also connected to the DRAM control IC 161. The controller control part 163 controls the entire image processor (print & scanner controller) 160. An network interface controller (NIC) 165 is connected to the communication control part 164, and the LAN 3 is connected to the NIC 165.

Next, the basic action of the image forming apparatus 1 will be described.

First, a procedure of accumulating image data in the image forming apparatus 1 will be described.

When image data is acquired by the scanner 130, the image of a document is optically read by the CCD 131 of the scanner 130. At this time, a command is issued to the scanner control part 132 by the image control CPU 113 and the action of the CCD 131 is controlled by the scanner control part 132.

The reading processor 116 applies a data process to the image read by the CCD 131 and thereafter, the image data is compressed by the compression IC 118 using a predetermined method.

The reading processor 116 conducts various types of processes such as an analog signal process, an analog-to-digital (A/D) conversion process, and a shading process on the image data read by the CCD 131 to generate digital image data. The data is compressed by a predetermined method in the compression IC 118. The data compression method is not particularly limited.

The image data compressed by the compression IC 118 is retained in the compression memory 121 via the DRAM control IC 111. Note that the image data can be also retained in the storage 127. The image data retained in the compression memory 121 and the storage 127 can be managed as image data for a job by the image control CPU 113.

When image data is acquired from the outside, for example, when image data is acquired from an external device or the like through the LAN 3, the NIC 165 receives the image data and retains the image data in the image memory 162 via the communication control part 164 and the DRAM control IC 161. These actions are controlled by the controller control part 163. When a RIP process is performed on the acquired image data, the image data is transferred to the controller control part 163 such that the RIP process is performed thereon and the obtained raster image data is retained in the image memory 162. Note that the image control CPU 113 may perform the RIP process.

The data in the image memory 162 is transmitted to the page memory 122 via the DRAM control IC 161, the PCI bus 112, and the DRAM control IC 111 and retained in the page memory 122. The data retained in the page memory 122 is sequentially sent to the compression IC 118 via the DRAM control IC 111 to be subjected to the compression process and the compressed image data is retained in the compression memory 121 or the storage 127.

When an image is output by the image forming apparatus 1 as a job, that is, when the image forming apparatus 1 is used as a copying machine or a printer, image data retained in the compression memory 121 or the storage 127 is sent out to the decompression IC 125 via the DRAM control IC 111 and the image data is extended. The extended image data is transferred to the writing processor 126 such that the writing processor 126 creates writing data and the image is written on the photoconductors by the LD 151. Thereafter, after undergoing development, transfer, fixing, and the like, the image is formed on a sheet.

When a job is output, in the operation part 140, whether image inspection is to be carried out can be set and instructions for the proof output and the actual output can be made.

When the image forming apparatus 1 is used as a printer, the printing conditions can be set by a printer driver in the external device 5. As in the case of the image, the printing conditions set here are transferred to the external device 5, the NIC 165, the image memory 162, the DRAM control IC 161 (controller), the DRAM control IC 111 (main body), and the page memory 122 in this order and retained in the page memory 122.

In the image forming apparatus 1, the proof output can be performed besides the actual output at the time of image output, and image inspection can be performed in both of the actual output and the proof output.

The proof output can be performed according to a user's instruction or the like, and the image inspection may be set to be carried out or not to be carried out, as an initial setting; furthermore, setting whether the image formation is to be carried out may be made possible at the time of output.

As described earlier, the image inspection determines the pass/fail for the image, for example, through comparison with the correct image using the reading result of the reading device 20. At this time, confirmation may be made by the user.

Figure 5:
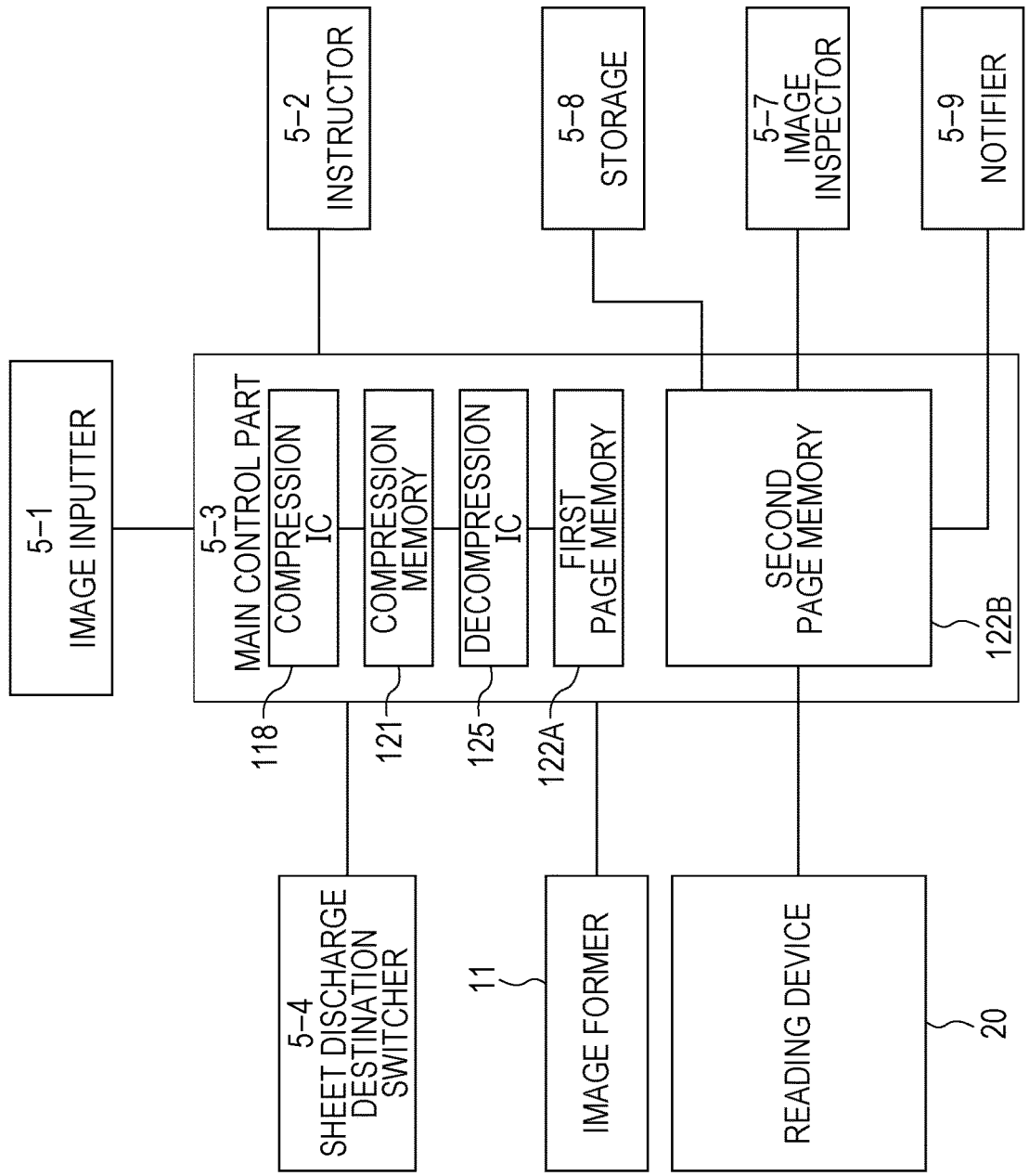
FIG. 5 is, similarly to above, a diagram illustrating control blocks in relation to printing and image inspection.
Figure 6:
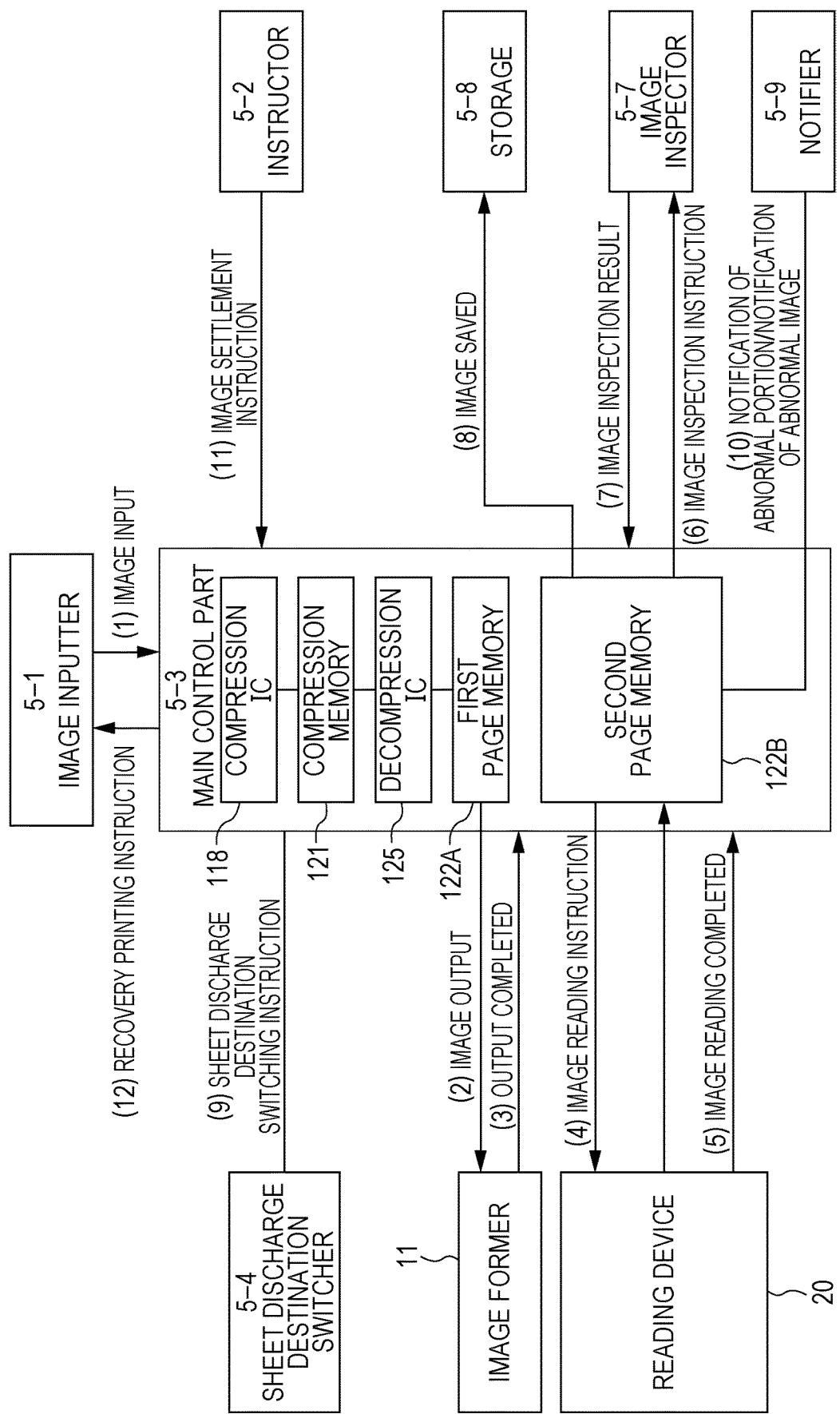
FIG. 6 is, similarly to above, a diagram illustrating processing contents of the control blocks in relation to printing and image inspection.

Next, some control blocks having functions relating to job printing and image inspection will be described with reference to FIGS. 5 and 6.

A main control part 5-3 can control image input and output, image inspection and output, and the like and has the compression IC 118, the compression memory 121, the decompression IC 125, a first page memory 122A, a second page memory 122B, and the like, in order to process image data. The first page memory 122A and the second page memory 122B are included in the page memory 122. The main control part 5-3 can fulfill the control function using a part of the functions of the control part.

An image inputter 5-1 accepts an input of an image from a print controller and can also receive an instruction for image inspection in the case of the job data. The image processor (print & scanner controller) corresponds to the print controller. The image inputter 5-1 is connected to the main control part 5-3. Furthermore, the image inputter 5-1 can receive an instruction for a proof mode (including a case in a correct image generation mode) and actual printing (including a case in an inspection mode).

The image former 11 is controllably connected to the main control part 5-3; the main control part 5-3 can output image data and instruct the image former 11 to form an image.

A sheet discharge destination switcher 5-4 is controllably connected to the main control part 5-3. The sheet discharge destination switcher 5-4 is provided in the sheet discharge device 30 and can switch the sheet discharge destination of a sheet introduced into the sheet discharge device 30.

The reading device 20 is controllably connected to the main control part 5-3 and the main control part 5-3 can instruct the reading device 20 to read an image. Furthermore, the main control part 5-3 can acquire a reading completion result together with the read image from the reading device 20.

An instructor 5-2 is controllably connected to the main control part 5-3. The instructor 5-2 can fulfill its function by the operation part 140. The main control part 5-3 controls the instructor 5-2 such that an instruction to settle the pass/fail for the image can be issued when it is ascertained that the image is abnormal through comparison between images.

The main control part 5-3 can instruct an image inspector 5-7 to inspect the read image. The image inspector 5-7 can be constituted by a part of the functions of the image control part 100. The inspection result of the image inspector 5-7 can be notified to the main control part 5-3.

A storage 5-8 retains printing image data, read image data, correct image data, and the like and can read these items of data as appropriate.

A notifier 5-9 can make a notification using a part of the functions of the operation part 140. For example, when it is ascertained that the image is not normal, the abnormal image and the abnormal portion are notified.

The notifier 5-9 may perform control to make a notification on a display or the like outside the image forming apparatus.

Next, specific action contents of the above control blocks will be described.

(1) An image is input through the image inputter 5-1. The image is input, for example, by receiving from the print controller.

(2) Once the print job is started, the main control part 5-3 compresses the image input by the image inputter 5-1 using the compression IC 118 and retains the compressed image in the compression memory 121. Furthermore, the compressed image retained in the compression memory 121 is decompressed using the decompression IC 125 and retained in the first page memory 122A.

(3) The main control part 5-3 instructs the image former 11 to output the image and the image former 11 writes the image on a sheet.

(4) After completing sheet discharge for the sheet in the image former 11, the image former 11 notifies the main control part 5-3 that the sheet discharge has been completed.

(5) The main control part 5-3 ascertains the presence or absence of an image inspection instruction and, if there is an image inspection instruction, instructs the reading device 20 to read the image.

(6) The reading device 20 reads the sheet after printing to retain in the second page memory 122B and notifies the main control part 5-3 that the reading has been completed.

(7) The main control part 5-3 instructs the image inspector 5-7 to inspect the image.

(8) The image inspector 5-7 inspects for defects on the basis of an image obtained by reading the print sheet. The main control part 5-3 is notified of a location where a defect has been found.

(9) The main control part 5-3 saves an image obtained by reading the sheet on which an abnormality has been found, in the storage 5-8.

(10) When an abnormality is found as a result of image inspection, the main control part 5-3 instructs the sheet discharge destination switcher 5-4 to change the sheet discharge destination to the abnormal sheet discharge tray.

(11) The main control part 5-3 notifies the notifier 5-9 of the abnormal image and the abnormal portion.

(12) The main control part 5-3 instructs the print controller to perform the recovery printing.

*For the recovery printing, (1) to (11) are repeated.

Figure 16:
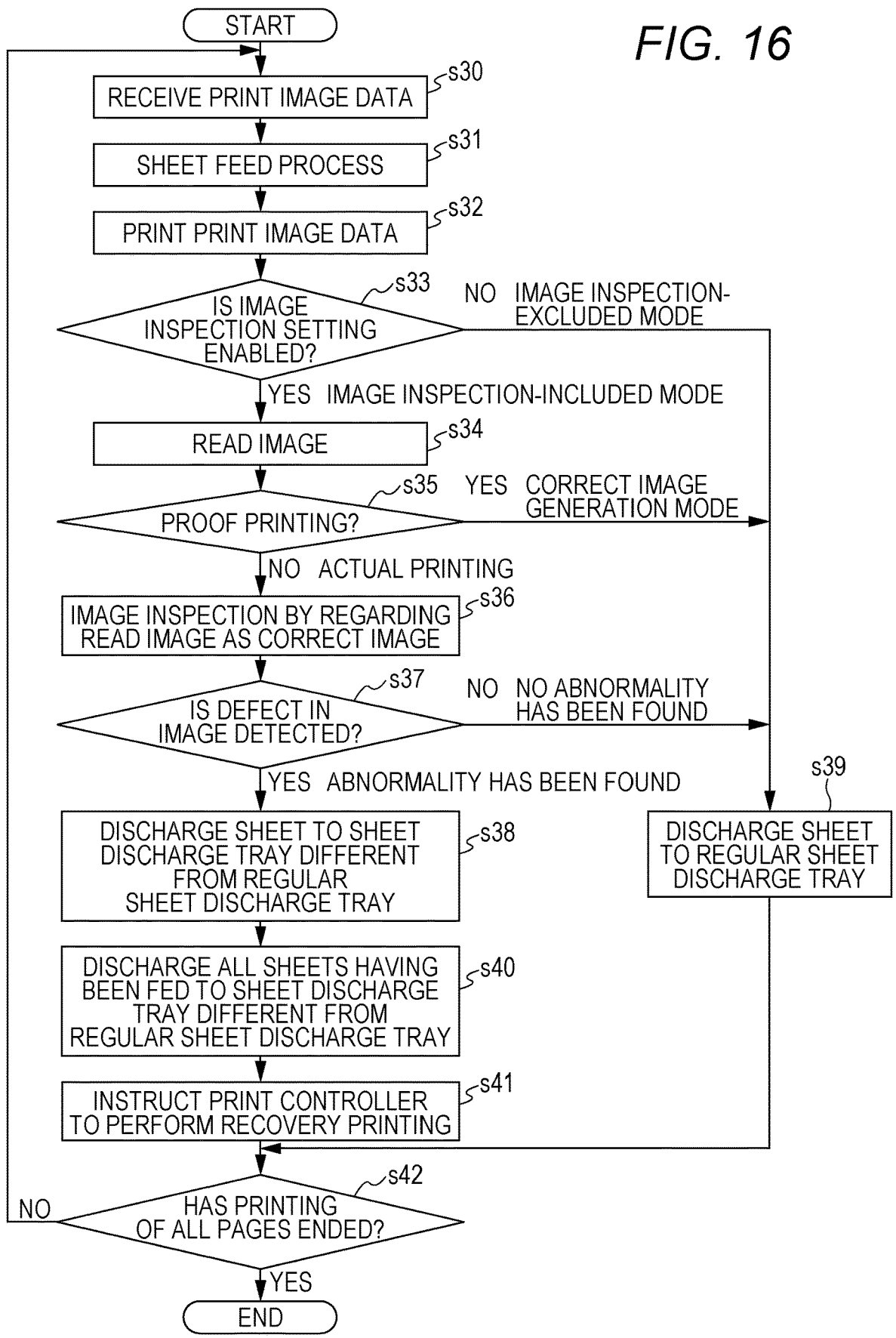
FIG. 16 is a flowchart illustrating a procedure of conventional image inspection.

For comparison, a procedure of conventional image inspection will be described next with reference to a flowchart in FIG. 16.

Print image data is received (step s30) and a sheet is fed by a sheet feed process (step s31). Printing is performed on the fed sheet with the print image data (step s32) and it is determined whether image inspection setting is enabled (step s33). When the image inspection setting is not enabled (step s33, No), the sheet of the printed matter is discharged to a regular sheet discharge tray as an image inspection-excluded mode (step s39) and it is determined whether printing of all the pages has ended (step s42).

If printing of all the pages has not ended (step s42, No), the procedure returns to step s30 and the procedure is repeated. If printing of all the pages has ended (step s42, Yes), the procedure is terminated.

If the image inspection setting is enabled in step s33 (step s33, Yes), the image of the printed matter is read as an image inspection-included mode (step s34).

Next, it is determined whether the output is the proof printing (step s35). When the output is the proof printing (step s35, Yes), the printed matter is discharged to the regular sheet discharge tray as the correct image generation mode (step s39) and, after the sheet is discharged, it is determined whether printing of all the pages has ended (step s42). The procedure in step s42 is the same as described above.

When the output is not the proof printing at step s35 (step s35, No), since the actual printing of the job is to be carried out, the read image read in step s34 is compared with the read image read in advance at the time of proof printing as the correct image and the image inspection is performed (step s36). As a result of the image inspection, it is determined whether the image is defective (step s37).

When it is not determined that the image is defective (step s37, No), it is regarded that no abnormality has been found and the printed matter is discharged to a regularly-used sheet discharge tray (step s39); then, it is determined whether printing of all the pages has ended (step s42). The procedure in step s42 is the same as described above.

When it is determined that the image is defective (step s37, Yes), it is regarded that an abnormality has been found and the printed matter is discharged to a sheet discharge tray different from the regularly-used sheet discharge tray (step s38); then, all of the sheets that have been fed are discharged to the sheet discharge tray different from the regularly-used sheet discharge tray (step s40). Subsequently, the print controller is instructed to perform the recovery printing (step s41). In the recovery printing, a page on which the abnormality has been detected and a page having been fed and remaining in the apparatus are reprinted.

After the instruction for the recovery printing, it is determined whether printing of all the pages has ended (step s42). The procedure in step s42 is the same as described above.

Figure 7:
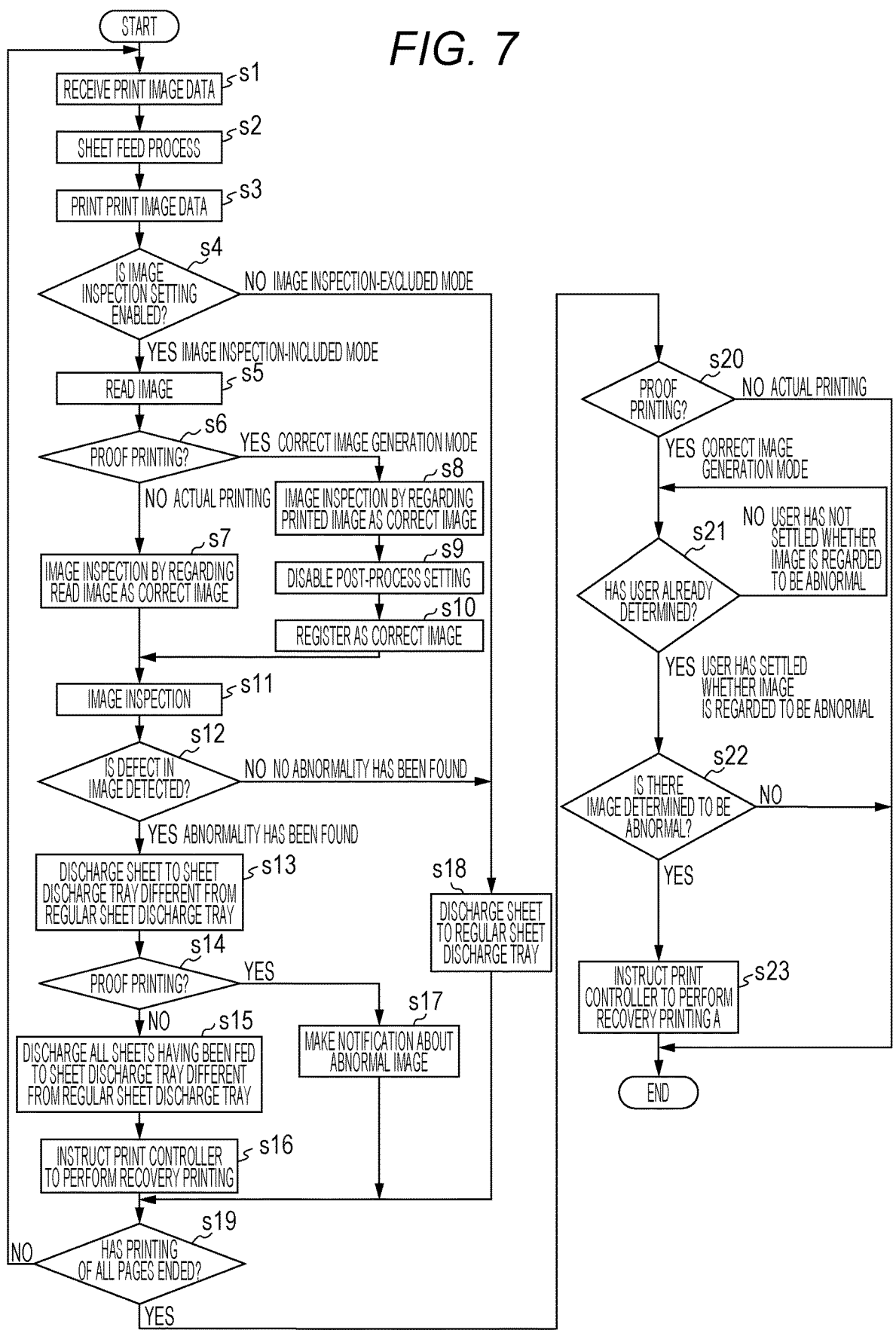
FIG. 7 is, similarly to above, a flowchart illustrating a procedure of image inspection.

Next, a procedure of image inspection according to the present embodiment will be described with reference to a flowchart in FIG. 7. The following procedure is executed under the control of the control part of the present invention.

Print image data is received through the image inputter 5-1 (step s1). The main control part 5-3 compresses the image input by the image inputter 5-1 using the compression IC 118 and retains the image after compression in the compression memory 121. Thereafter, the compressed image retained in the compression memory 121 is decompressed using the decompression IC 125 and the decompressed image is retained in the first page memory 122A. The printing image data is received from the print controller.

Next, a sheet feed process for a sheet is performed (step s2) and printing is performed on the sheet with the print image data (step s3). The main control part 5-3 instructs the image former 11 to output the image and the image former 11 transfers the image to the sheet to print. After completing sheet discharge for the sheet from the apparatus main body 10, the image former 11 notifies the main control part 5-3 that the sheet discharge has been completed.

Next, it is determined whether image inspection setting is enabled (step s4). The main control part 5-3 ascertains the presence or absence of an image inspection instruction on the basis of job setting information, an action mode, or the like.

When the image inspection setting is disabled (step s4, No), the printed matter is discharged to a regularly-used sheet discharge tray (step s18).

When the image inspection setting is enabled (step s4, Yes), the image of the sheet after printing is read (step s5). The main control part 5-3 instructs the reading device 20 to read the image. The reading device 20 reads the image of the sheet after printing by one or both of the image readers 24 and 25 to retain the acquired read image in the second page memory 122B and notifies the main control part 5-3 that the reading has been completed.

Upon finishing image reading, it is determined whether the proof printing is to be carried out (step s6).

When the proof printing is to be carried out (step s6, Yes), the main control part 5-3 stands by for image inspection by regarding the printed image received from the image inputter 5-1 as a correct image (step s8). The main control part 5-3 treats the printing image received from the image inputter 5-1 as a correct image.

When a post-process is set, the main control part 5-3 disables the setting (step s9). As described earlier, instead of disabling all the post-processes, only a part of the post-processes can be disabled and, for example, only a post-process affecting the printing area of the image can be disabled. In addition, for example, when the user wishes to confirm the printed matter after the post-process, the post-process may not be disabled.

The main control part 5-3 registers the read image read by the reading device 20 as a correct image for the time of actual printing (step s10) and performs image inspection (step s11).

When the proof printing is not to be carried out (step s6, No), the actual printing is regarded to be performed and standby for image inspection is enabled by regarding the read image read in the proof mode as a correct image (step s7); then, image inspection is performed (step s11).

In the image inspection, the main control part 5-3 instructs the image inspector 5-7 to inspect the image. The image inspector 5-7 inspects the image obtained by reading the print sheet for defects and notifies the main control part 5-3 of the inspection result and a location where a defect has been found.

After the image inspection, it is determined whether a defect in the image has been detected (step s12). When no defect in the image is detected (step s12, No), the main control part 5-3 sets the sheet discharge destination to a sheet discharge tray for regular sheets by the sheet discharge destination switcher 5-4 and discharges the sheet to the regular sheet discharge tray (step s18).

When a defect in the image is detected (step s12, Yes), the main control part 5-3 instructs the sheet discharge destination switcher 5-4 to switch the sheet discharge destination to the abnormal sheet discharge tray and discharges the sheet to the abnormal sheet discharge tray (step s13).

Next, the main control part 5-3 determines whether the print mode is the proof mode (proof printing) (step s14).

When the print mode is not the proof printing (step s14, No), the actual output is to be carried out and all the sheets having been fed and remaining in the apparatus are discharged to the abnormal sheet discharge tray (step s15). The print controller is instructed to perform the recovery printing (step s16) and thereafter, it is ascertained whether printing of all the pages has ended (step s19). In the recovery printing, a page on which the abnormality has been detected and a page having been fed and remaining in the apparatus are reprinted.

When the proof mode is the proof printing (step s14, Yes), the main control part 5-3 instructs the notifier 5-9 to make a notification about the abnormality and the abnormal image is notified (step s17). Thereafter, it is ascertained whether printing of all the pages has ended (step s19). In the notification, only the occurrence of an abnormality may be notified; furthermore, the abnormal image, abnormality information (e.g., the position of the abnormality and contents of the abnormality), and the like may be transmitted to the notifier 5-9. The notifier 5-9 can inform that there is an abnormal image or can display information about an abnormal image on the notifier 5-9.

When printing of all the pages has not ended in the determination (step s19) as to whether printing of all the pages has ended (step s19, No), the procedure returns to step s1 and the process is repeated.

When printing of all the pages has ended (step s19, Yes), it is again determined whether the output is the proof printing (step s20).

When the output is not the proof printing (step s20, No), the actual printing of the job is to be carried out and the procedure is instantly terminated.

When the output is the proof printing (step s20, Yes), it is determined whether the user has determined the image in which the abnormality has been detected, as the correct image generation mode. The main control part 5-3 ascertains whether the user has performed, on the instructor 5-2, an operation for settling the normality or abnormality for the image in which the abnormality has been detected as a result of the image inspection (step s21). In this embodiment, the settlement operation by the user is performed on the detection result. However, in the present invention, the pass/fail for the image may be determined by comparing images without waiting for the user's settlement operation.

When the user has not selected whether the image is regarded to be abnormal (step s21, No), the procedure is provisionally suspended until a determination is made. At this time, the apparatus can be stopped.

When the user has already made the determination and has settled whether the image is regarded to be abnormal (step s21, Yes), it is determined whether there is an image determined to be abnormal (step s22). If there is no image determined to be abnormal (step s22, No), the procedure is terminated.

If there is an image determined to be abnormal (step s22, Yes), the print controller is instructed to perform recovery printing A. In this step, the main control part 5-3 instructs the print controller to perform the recovery printing with only a sheet in which the abnormality has been detected as a recovery target.

If the user has already determined the pass/fail for the image at the time point of completion of output of all the pages in the proof printing, recovery output is continuously performed after all the pages are printed; if the determination has not been made yet, the recovery printing is performed upon acceptance of the user's determination.

According to the present embodiment, since the image inspection is performed on the basis of the read image and the printed image at the time of proof printing for creating the correct image, the rate of finding abnormalities at the time of creation of the correct image is improved and, as a result, the precision of finding abnormalities at the time of actual printing can be improved.

In addition, when an abnormality is found by the image inspection in the proof mode, the recovery printing is carried out only for a sheet in which the abnormality has been found, such that there is no need to print all the pages again in order to make the correct image; accordingly, the effect of eliminating waste and a shortened time until completion of creation of the correct image can be achieved and there is also the effect of surely reducing oversight. However, the present invention is not limited to this configuration.

On the other hand, according to the prior art, since the image inspection is not carried out in the proof mode with the image inspection method in which the read image after printing is regarded as being correct, the user visually confirms whether the real printed matter is abnormal. In addition, even if the user finds an abnormality in the printed matter by visual check, it is necessary to print all the pages again in order to make the correct image and the normal sheet is also reprinted; accordingly, it takes time until completion of creation of the correct image and waste of sheets occurs due to reprinting of the normally printed sheets.

The productivities in a case where the image inspection is performed according to the present embodiment and the prior art will be described with reference to FIG. 8. In this example, it is assumed that there is an abnormality for the first time of the proof printing, in setting of performing proof printing and actual printing for three copies.

Figure 8:
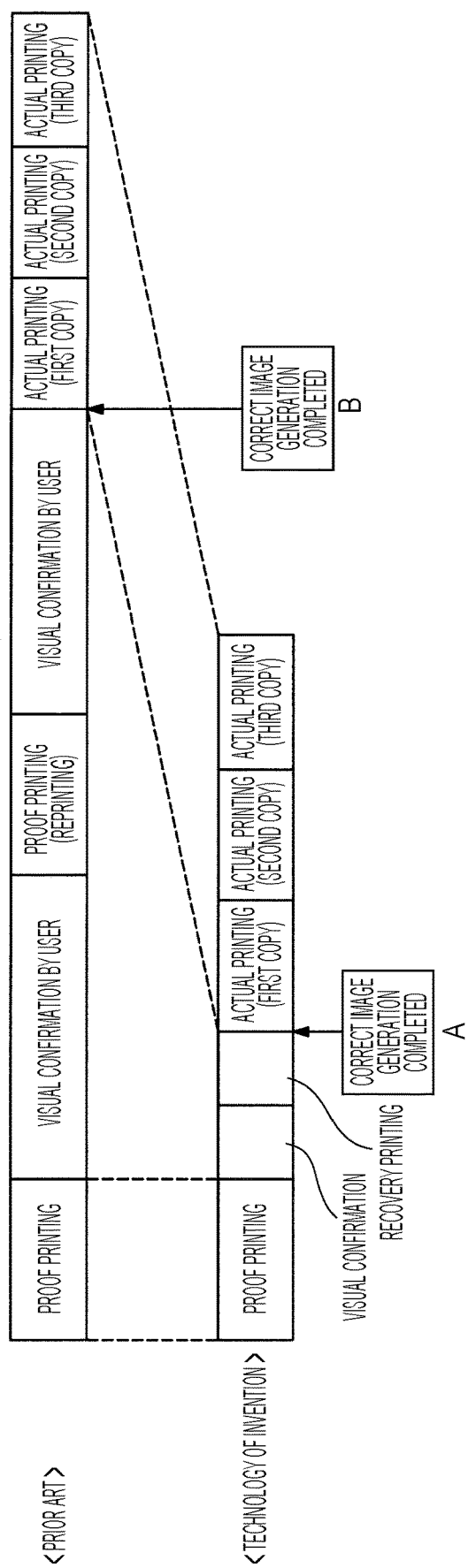
FIG. 8 is a diagram illustrating productivity by image inspection of an embodiment of the present invention, productivity by conventional image inspection, and a difference therebetween.

In the prior art, as illustrated in the upper part of FIG. 8, the user visually confirms the sheets that have been printed for all the pages after the proof printing and the proof printing is executed again because an abnormality is detected. In this case, the proof printing is performed not only for the sheet having the abnormality but also for all the other pages. After printing, the user visually confirms the sheets that have been printed and, since there is no abnormality, the generation of the correct image is completed here (it is the time at B in FIG. 8).

On the other hand, in the technology of the present invention, as illustrated in the lower part of FIG. 8, the image inspection is performed by the apparatus after the proof printing and an abnormality is detected. After the user visually confirms the abnormal sheet, the recovery printing is performed only for the abnormal sheet. Since there is no abnormality in the recovery printing, the generation of the correct image is completed here (it is the time at A in FIG. 8).

As is clear from the above description, it can be seen that, with the procedure of the present invention, the productivity is greatly enhanced as compared with the prior art. In addition, since only a sheet detected as having an abnormality in the image is visually checked in the proof printing, the visual check work is greatly reduced and moreover, oversight can be also greatly reduced because the visual check work is limited to a sheet in which an abnormality is detected.

Targets for image comparison in the image inspection in the present embodiment will be described with reference to FIG. 9.

The uppermost part illustrates data of the input images (printing images), the middle part illustrates the read image data (image of output) in the proof mode, and the lowermost part illustrates the read image data (image of output) at the time of actual printing (actual output).

At the time of output in the proof mode, the input image is compared with the read image in the proof mode as the correct image during the image inspection and the pass/fail for the image is detected from a difference therebetween.

At the time of actual output, the read image read in the proof mode is compared with the read image in the actual output as the correct image during the image inspection and the pass/fail for the image is detected from a difference therebetween.

Figure 10:
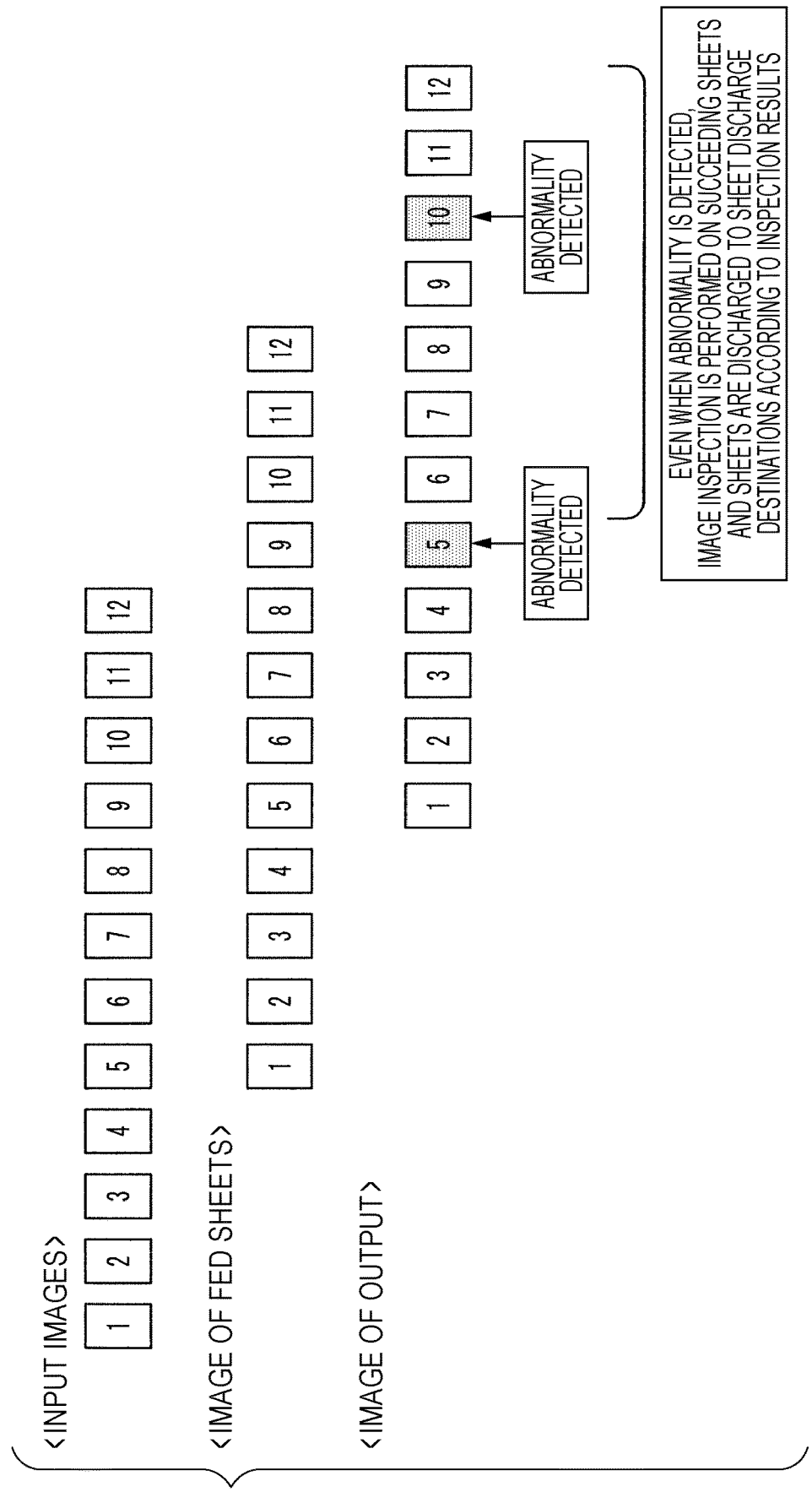
FIG. 10 is, similarly to above, a diagram for explaining image inspection at the time of proof output.

Next, with reference to FIG. 10, description will be made on image inspection when an image is detected to be abnormal by image inspection at the time of proof printing.

Figure 9:
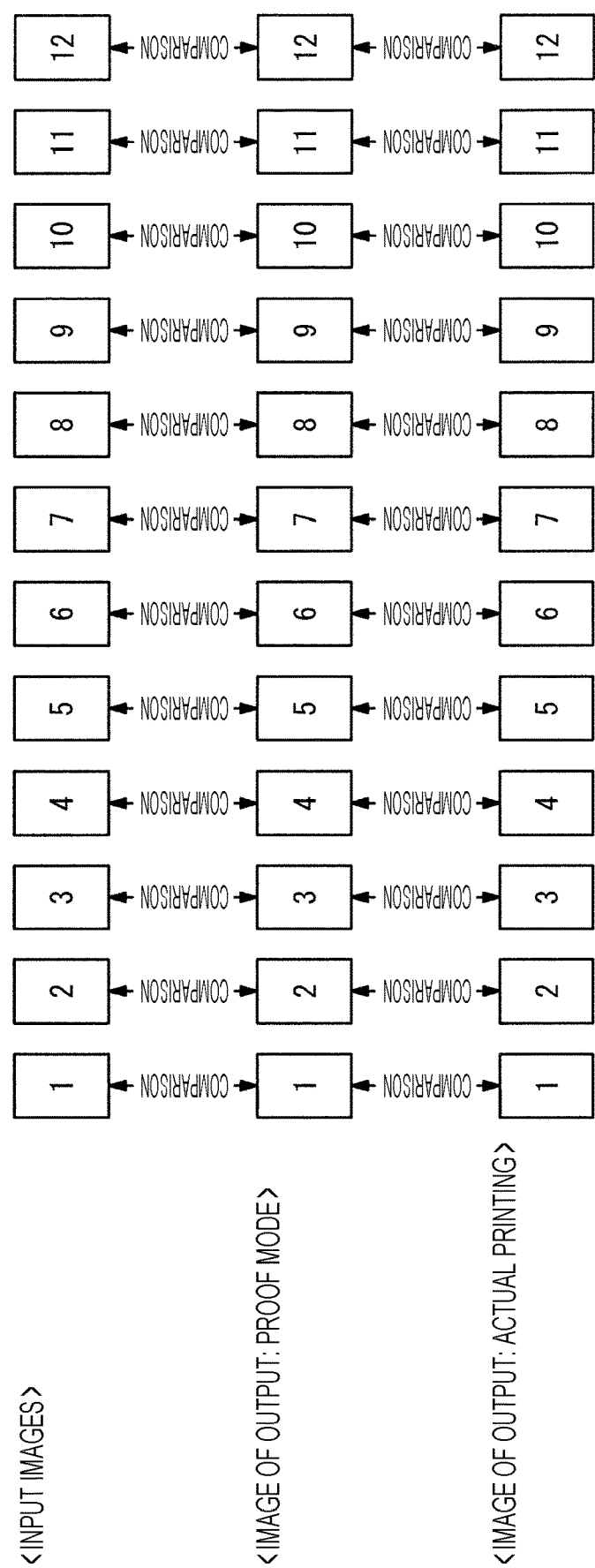
FIG. 9 is a diagram illustrating proof outputs and comparison targets of image inspection for actual outputs in an embodiment of the present invention.

On the basis of the input images illustrated in the upper part of FIG. 9, sheets are fed as illustrated in the middle part of FIG. 9 to form images. These sheets are read and image inspection is performed on image reading data (image of output). As a result of the image inspection, in this example, the image is detected to be abnormal on the fifth and tenth pages. Even when an abnormality is detected, the image inspection is performed on the succeeding sheets and the sheets are discharged to the sheet discharge destinations according to the inspection results.

When an abnormality is detected while the proof printing is carried out, it is desirable to inform the user that an abnormality has occurred. As a method of informing the user, for example, a display for alerting that an abnormality has occurred can be made on the operation part 140 or the like, or the occurrence of an abnormality can be notified to an external device or the like, or a flasher light can be lit to let the user know right away; however, in the present invention, the method of informing is not limited to a particular one.

Figure 11:
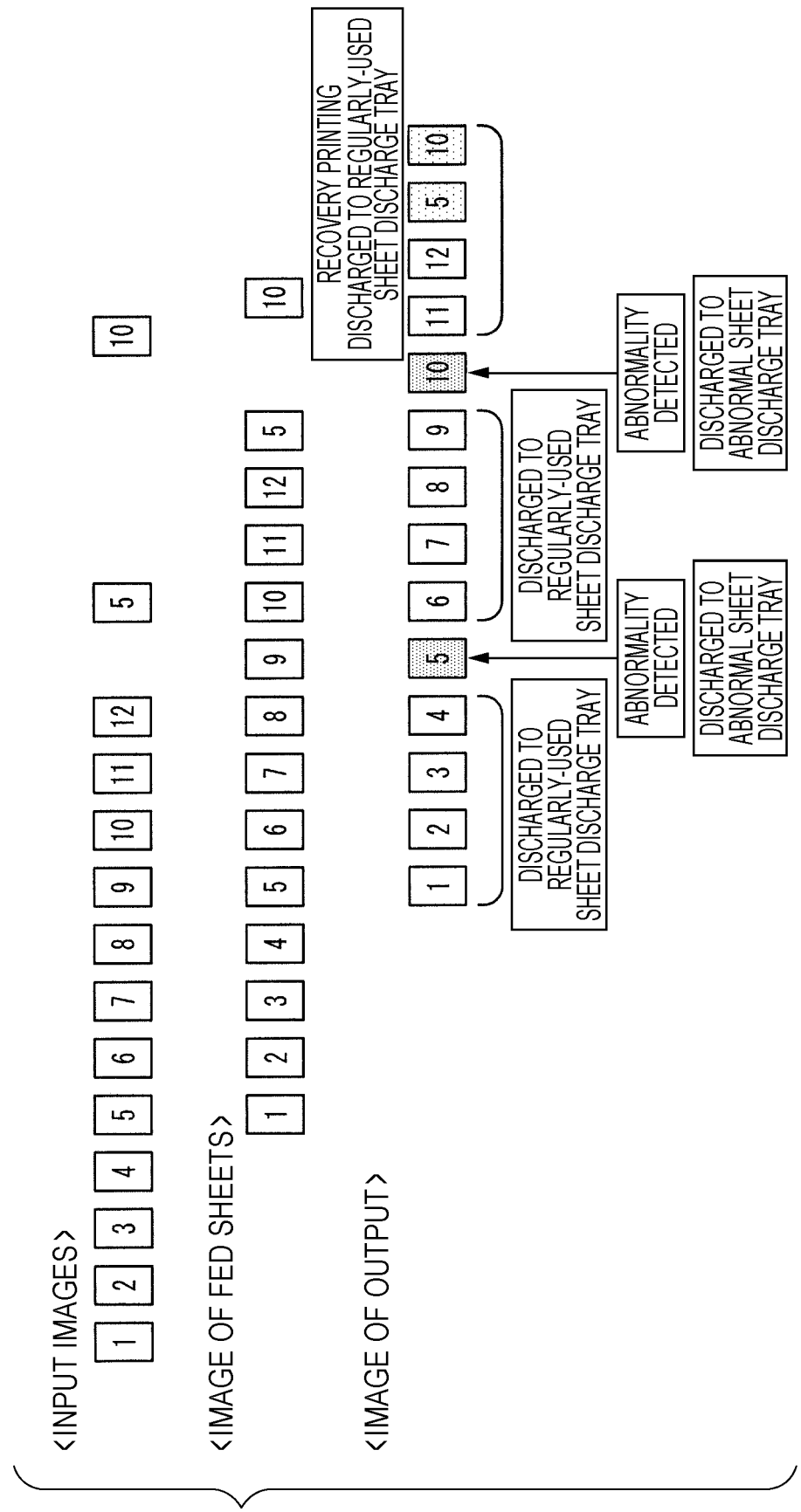
FIG. 11 is, similarly to above, a diagram for explaining the action of recovery printing at the time of proof output.

Next, sheet discharge and recovery printing in a case where the image is detected to have an abnormality during the proof printing are illustrated in FIG. 11.

The upper part illustrates an image of the input images, the middle part illustrates an image of fed sheets on which the input images are to be printed, and the lower part illustrates an image of the printed images output to the sheets. Also in this example, the images on the fifth and tenth pages are assumed to have an abnormality and the job has 12 pages.

Input images are prepared from the first page to the twelfth page and input images for the fifth and tenth pages are prepared again because of image abnormality.

Along with this, the first to twelfth pages are printed and additionally, the fifth and tenth pages are subjected to the recovery printing.

In image reading, the first to twelfth pages are read and the read images of the fifth and tenth pages are obtained by the recovery printing. Note that the first to fourth pages of the sheets that have been printed are discharged to the regular sheet discharge destination and the next fifth page is discharged to the abnormal sheet discharge tray different from the regular sheet discharge destination. The sixth to ninth pages are discharged to the regular sheet discharge destination and the tenth page is discharged to the abnormal sheet discharge tray different from the regular sheet discharge destination. The eleventh and twelfth pages and the fifth and tenth pages in the recovery printing are discharged to the regularly-used sheet discharge tray.

Even when an abnormality is detected on the fifth output sheet, image inspection for the succeeding sheets continues and the recovery printing for a sheet in which an abnormality is detected is performed subsequently to the last page (output order is not guaranteed). Instead of guaranteeing the output order, there is the effect of avoiding the occurrence of wasting sheets for recovery and shortening the time to completion of generation of the correct image.

Figure 12:
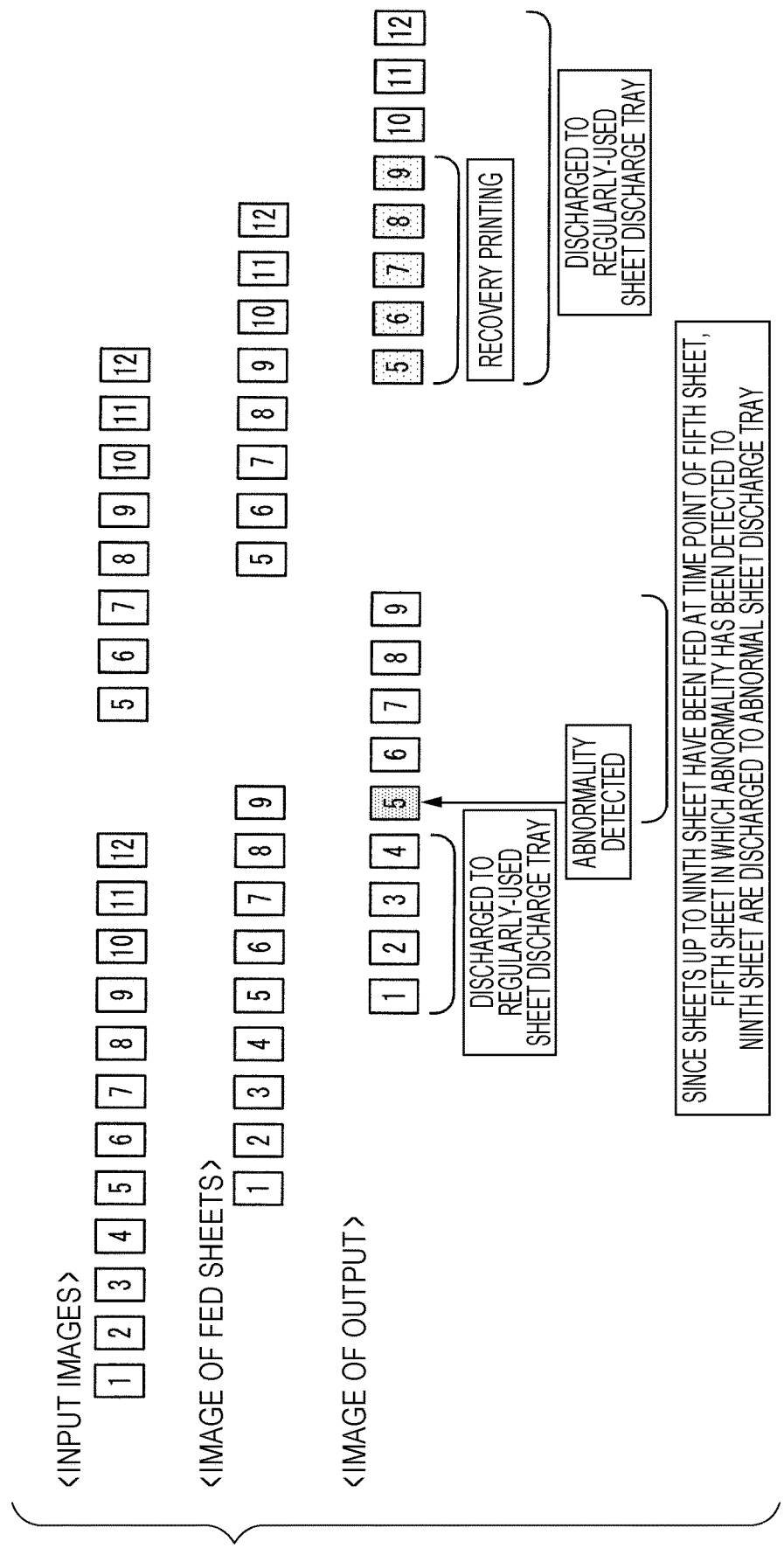
FIG. 12 is a diagram for explaining the action of recovery printing at the time of actual output.

In order to compare the variety between a recovery action at the time of actual printing and a recovery action in the proof mode, the recovery action (prior art) at the time of actual printing will be described with reference to FIG. 12. The upper part illustrates an image of the input images, the middle part illustrates an image of fed sheets on which the input images are to be printed, and the lower part illustrates an image of the printed images output to the sheets. When an abnormality is detected on the fifth output sheet, the sheets that have been fed (sixth to ninth sheets in FIG. 12) are all discharged to the abnormal sheet discharge tray. At this time, image inspection is not carried out for the sixth to ninth sheets. Next, the recovery printing is performed from a sheet on which an abnormality is detected (fifth page) (the output order is guaranteed).

Next, a description will be given of a process in a case where image inspection is performed in the proof mode when the job is set such that a post-process is to be performed.

When image inspection is performed in the proof mode, there is a problem that visual confirmation is difficult for the user depending on a post-processing function being set.

Regardless of any post-processing function, when the image forming apparatus detects an abnormality during image inspection, the post-process is not conducted because the sheet is discharged to the abnormal sheet discharge tray and thus there is no problem in visual recognition. However, the post-process is conducted on a sheet detected to be normal and there are cases where visual recognition is difficult for a part of the sheet; accordingly, depending on the user's level setting for abnormality detection (for example, the degree of stain detection) in the image inspection, there is a possibility that the user cannot tolerate the printed matter ascertained to be correct by the apparatus. Therefore, the user can visually confirm a normally discharged sheet, but at this time, visual recognition is difficult when a post-process has been conducted thereon. For this reason, during the proof printing for generating the correct image, the post-process setting is disabled in a print job set such that image inspection is to be performed. This also has the effect of not consuming resources for granting the post-process.

Meanwhile, whether the amount of margin in the sheet is exact or confirmation of the finishing of the post-process itself sometimes cannot be ascertained before the post-process is really granted. In this case, the post-process setting is required to be enabled. Thus, at the time of proof printing of a print job set such that image inspection is to be performed, the post-process setting is switched between being enabled and being disabled according to the set post-processing function.

Furthermore, at the time of proof printing of a print job set such that image inspection is to be performed, the post-process setting may be switched between being enabled and being disabled according to the set post-processing function. For example, in the case of a function affecting the printing area of the image, the post-process may be disabled so as to make it easy to visually recognize the printed matter and a function not affecting the printing area of the image may not be disabled. With this setting, it is possible to perform the post-process within a range that does not hinder visual recognition of the printed matter. In addition, whether the post-process is to be carried out may be specified depending on the setting by the user.

Figure 13:
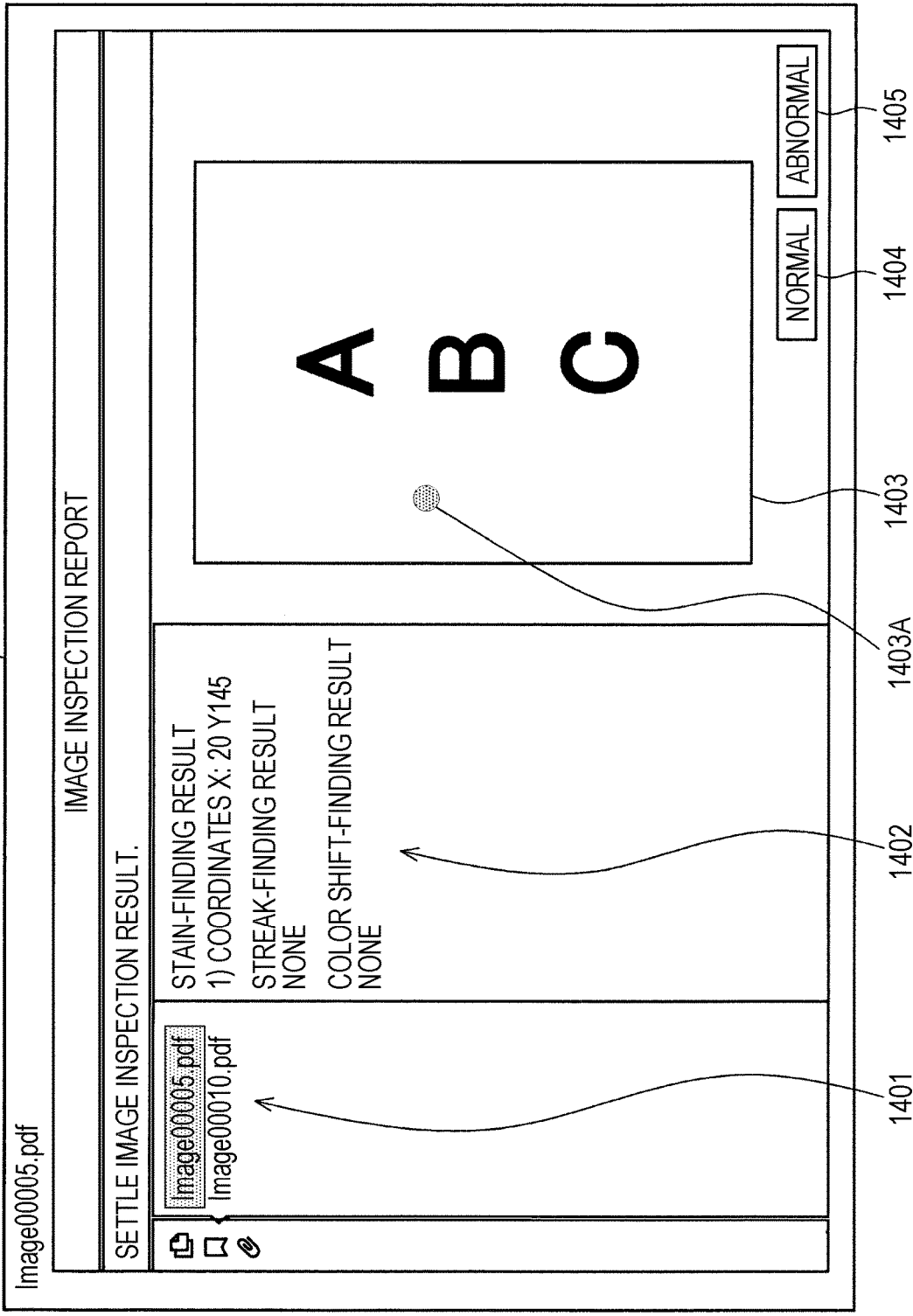
FIG. 13 is, similarly to above, a diagram illustrating a display screen of an image inspection report at the time of proof output.

FIG. 13 illustrates a report screen 1400 of an image inspection report at the time of proof output. The report screen 1400 can be displayed on the display provided in the operation part 140, an external personal computer (PC), or the like.

On the report screen 1400, file names of pages are selectably displayed in a page selection column 1401 and an abnormality information display column 1402 is prepared on the right side of the page selection column 1401, in which information about abnormality is displayed when an abnormality is found. In the example in FIG. 13, "Image00005.pdf" which is the file name of the read image on the fifth page is selected in the page selection column 1401 and, in the abnormality information display column 1402, it is indicated, as a result, that stain was found at a position of which the X coordinate is 20 and the Y coordinate is 145. In addition, it is displayed that no streaks or color shift is detected.

A read image display column 1403 for displaying the read image of the selected page is prepared on the right side of the report screen 1400 and an abnormal part 1403A is displayed in the read image display.

By confirming the read image displayed in the read image display column 1403, the user can visually confirm the displayed image and can ascertain whether this read image is normal or abnormal.

A "normal" button 1404 and an "abnormal" button 1405 are displayed so as to be pressable on a lower side of the read image display column 1403 and, when the user ascertains that the image is normal, the determination that the read image is normal is settled by pressing the "normal" button 1404 and the image is registered as a correct image. When the user ascertains that the read image is abnormal, the determination that the image is abnormal is settled by pressing the "abnormal" button 1405.

Furthermore, even when the apparatus ascertains that the image is abnormal, in a case where the user ascertains that the image is normal, it is possible to register the read image as a correct image and not to treat as a target of the recovery printing.

The above report may be displayed only when it is detected that the image is abnormal. However, in the present invention, a report may be displayed when the image is regarded to be normal such that the user can make selection, or an image detected to be normal and an image detected to be abnormal may be distinguishably displayed.

From the abnormal image information displayed on the screen, the user can easily search for an abnormal portion of the sheet discharged to the abnormal sheet discharge tray and, if the image has no problem, the user can select that the image is normal. When it is selected that the image is abnormal, the image is to be recovered.

Figure 14:
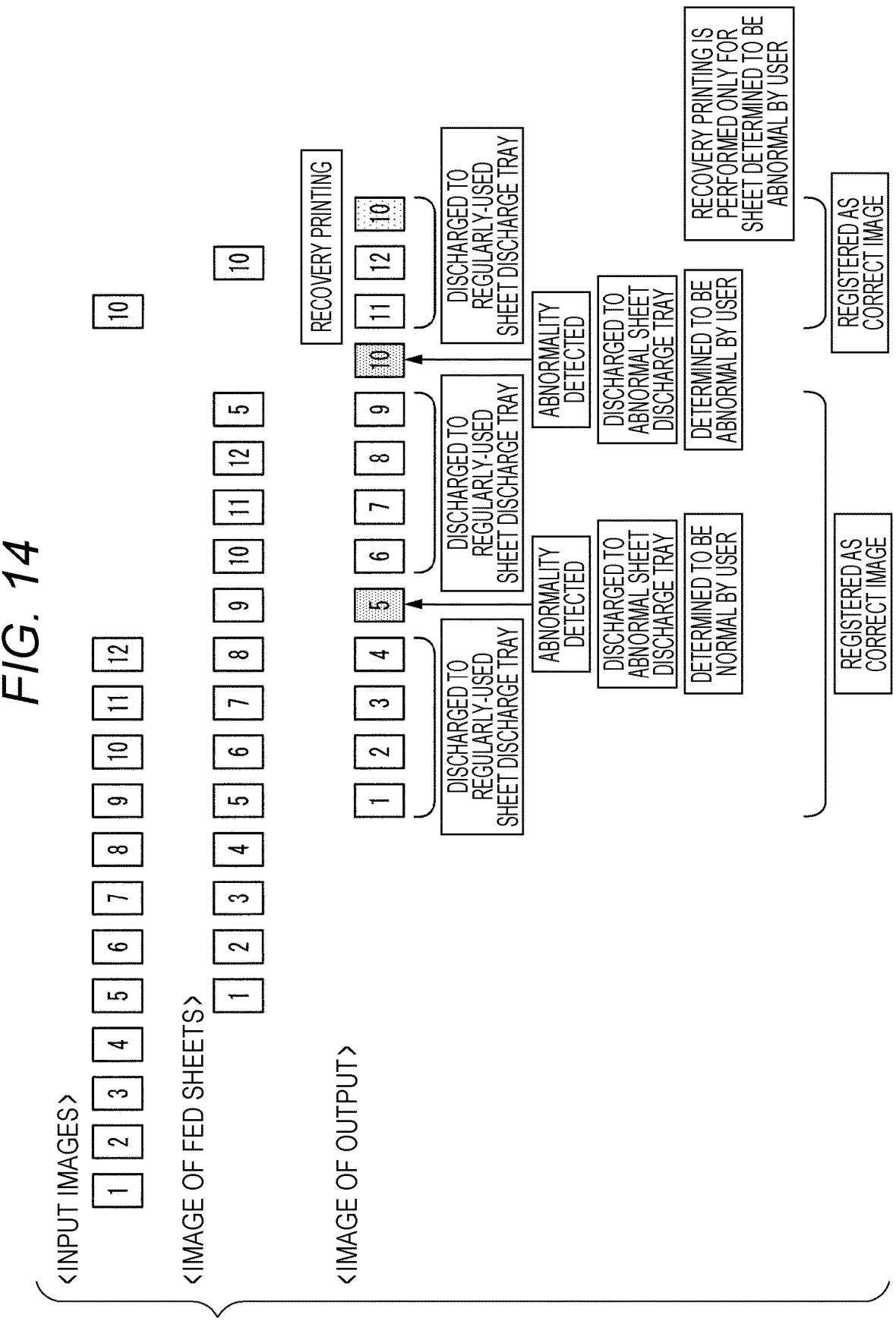
FIG. 14 is, similarly to above, a diagram for explaining actions of sheet discharge and recovery printing based on user determination when it is ascertained that there is an abnormality in an image at the time of proof output.

FIG. 14 is a diagram for explaining an action example when the user ascertains the normality or abnormality during the proof printing.

This example indicates a case where abnormalities are detected on a sheet of the fifth page and a sheet of the tenth page and, among these sheets, the user determines the sheet of the fifth page to be normal and determines the sheet of the tenth page to be abnormal.

Since the sheet of the fifth page is detected to be abnormal by the apparatus but determined to be normal by the user, read images of the sheets of the first to ninth pages including the fifth page are registered as correct images and the recovery printing for the image of the fifth page is not performed.

On the other hand, the sheet of the tenth page is detected to be abnormal by the apparatus and furthermore designated to be abnormal by the user; accordingly, the determination that the sheet of the tenth page is abnormal is settled. Therefore, this image is not registered as a correct image and the recovery printing is performed only for the tenth page after all the pages (first to twelfth pages) are output; then, an image read during the recovery printing is registered as the correct image of the tenth page.

By the above procedure, it is possible to perform the recovery printing only for an image ascertained to be abnormal by the user.

In this example, the read image obtained by the recovery printing is immediately treated as a correct image, but image inspection may be also performed on the image by the recovery printing such that an image determined to be normal is registered as a correct image.

In addition, in a case where the abnormality is settled by the user before the recovery printing, the recovery printing can be immediately performed without stopping the output of the apparatus; but when the determination is not made by the user before printing of all the pages ends, the apparatus may be temporarily stopped after printing all the pages such that the recovery printing is performed after accepting the user's determination.

Figure 15:
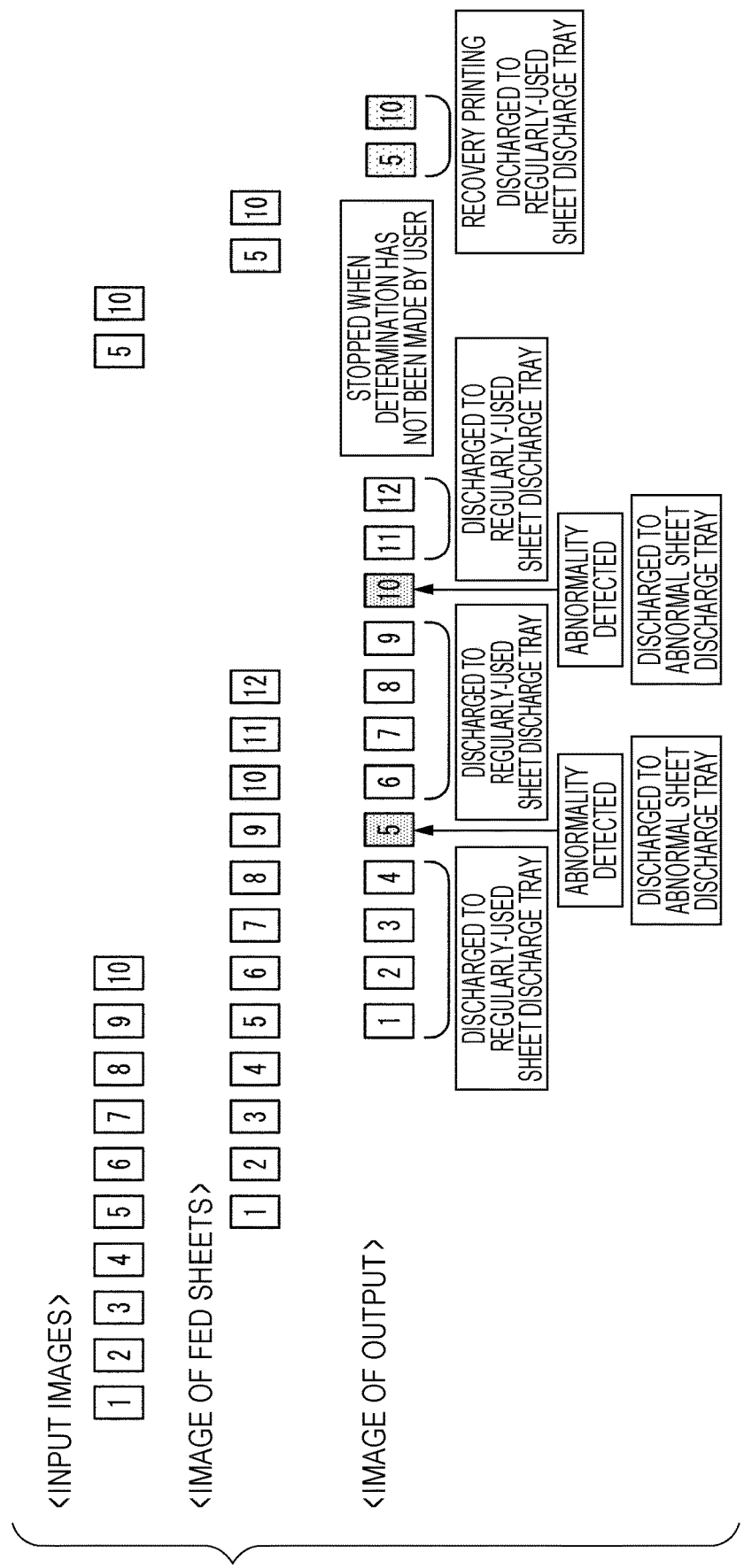
FIG. 15 is, similarly to above, a diagram for explaining the action of the apparatus and the action of recovery printing based on the presence or absence of user determination when it is ascertained that there is an abnormality in an image at the time of proof output.

In the example in FIG. 15, since the user determines that the fifth and tenth pages are abnormal, the recovery printing for the fifth and tenth pages is performed after the determination by the user.

The image forming apparatus displays a selection screen to the user at the time point of detecting an abnormality and can continue the printing action without pausing the apparatus. When the user has settled the normality or abnormality by the end of printing of the last page, the recovery printing for a page for which the abnormality has been settled is continuously carried out. On the other hand, when an operation for the normality or abnormality is not performed by the user at the time point when printing of the last page ends, the apparatus can be temporarily stopped to wait for an input by the user.

According to the above action, when the determination has been made by the user, it is possible to promptly start the recovery printing and accordingly the generation time of the correct image is shortened.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus that prints an image on a recording medium, the image forming apparatus comprising:
  an image former that forms the image on the recording medium; and
  a hardware processor configured to operate the image forming apparatus as follows: when proof printing is performed for a job:
    the image former forms a proof image on a recording medium;
    the hardware processor performs an image inspection in which read image data obtained by reading the proof image is compared with the image data that is used to form the proof image;
    subjects the proof image to a pass/fail test, and
    when the proof image passes the pass/fail test, registers the read image data of the proof image as correct image data;
  when actual printing of the job is performed:
    the image former forms a second image on a recording medium;
    reads the second image;

subjects read image data obtained by reading the second image to a pass/fail test by comparing the read image data obtained by reading the second image to the correct image data obtained by reading the proof image; and determines a pass/fail for the second image.

2. The image forming apparatus according to claim 1, wherein, when determining a pass/fail for an image during the actual printing, the hardware processor uses only a read image for which an image is determined to be normal during the proof output, to compare with a read image read during the actual printing.

3. The image forming apparatus according to claim 1, wherein, when an image is determined not to be normal by the image inspection during the proof printing, the hardware processor performs control to inform a user.

4. The image forming apparatus according to claim 1, wherein, when an image is determined not to be normal by the image inspection during the proof printing, the hardware processor distinguishes a recording medium of the image determined not to be normal from a regular sheet discharge destination when discharging.

5. The image forming apparatus according to claim 1, wherein the hardware processor makes it possible for a user to settle determination about a pass/fail for an image when the image is detected not to be normal through comparison between images at the time of the image inspection.

6. The image forming apparatus according to claim 5, wherein, when an image is detected not to be normal through comparison between images at the time of the image inspection, the hardware processor determines the image to be normal in the image inspection in a case where the image is settled to be normal by the user.

7. The image forming apparatus according to claim 1, wherein, when an image is determined not to be normal by the image inspection, the hardware processor performs recovery printing for the image determined not to be normal on a new recording medium.

8. The image forming apparatus according to claim 7, wherein, when the recovery printing is performed during the proof printing, the hardware processor performs the recovery printing after printing all pages of a job for which determination about a pass/fail for an image is being made.

9. The image forming apparatus according to claim 7, wherein, when an image is determined not to be normal by a user before recovery printing, the hardware processor executes the recovery printing without stopping the running image forming apparatus.

10. The image forming apparatus according to claim 7, wherein the hardware processor performs image inspection in which at least a read image obtained by reading a recording medium on which recovery printing has been performed is compared with a printing image of a job before an image is formed, and a pass/fail for the image is determined.

11. The image forming apparatus according to claim 1, wherein, when an image is determined not to be normal by the image inspection during the proof printing, the hardware processor performs recovery printing only for the image determined not to be normal on a new recording medium.

12. The image forming apparatus according to claim 1, wherein, when an image is determined not to be normal by the image inspection during the proof printing, the hardware processor continues to determine a pass/fail for an image on a recording medium succeeding a recording medium determined not to be normal.

13. The image forming apparatus according to claim 1, wherein, when post-process setting for performing a post-process is made for a job, the hardware processor disables the post-process setting in a case where the image inspection is performed.

14. The image forming apparatus according to claim 13, wherein, at the time of the image inspection, the hardware processor disables the post-process setting when the post-process setting has a function affecting a printing area of an image, and does not disable the post-process setting when the post-process setting is a function not affecting a printing area of an image.

15. The image forming apparatus according to claim 1, wherein, when post-process setting for performing a post-process is made for a job, the hardware processor does not disable the post-process setting when performing the image inspection.

* * * * *